United States Patent
Nishikido et al.

(10) Patent No.: US 11,940,523 B2
(45) Date of Patent: Mar. 26, 2024

(54) ELECTRONIC DEVICE, INFORMATION PROCESSING APPARATUS, METHOD, PROGRAM, AND DATA STRUCTURE

(71) Applicant: KYOCERA Corporation, Kyoto (JP)

(72) Inventors: Masamitsu Nishikido, Yokohama (JP); Tooru Sahara, Yokohama (JP); Youhei Murakami, Yokohama (JP); Satoshi Kawaji, Yokohama (JP); Masayuki Sato, Yokohama (JP); Takuya Homma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 288 days.

(21) Appl. No.: 17/594,546

(22) PCT Filed: Apr. 1, 2020

(86) PCT No.: PCT/JP2020/015018
§ 371 (c)(1),
(2) Date: Oct. 21, 2021

(87) PCT Pub. No.: WO2020/217897
PCT Pub. Date: Oct. 29, 2020

(65) Prior Publication Data
US 2022/0221568 A1 Jul. 14, 2022

(30) Foreign Application Priority Data
Apr. 24, 2019 (JP) .................. 2019-083109

(51) Int. Cl.
*G01S 13/34* (2006.01)
*G01S 7/00* (2006.01)
(Continued)

(52) U.S. Cl.
CPC .............. *G01S 13/34* (2013.01); *G01S 7/003* (2013.01); *G01S 7/023* (2013.01); *G01S 13/44* (2013.01);
(Continued)

(58) Field of Classification Search
CPC ....................................................... G01S 13/34
See application file for complete search history.

(56) References Cited

U.S. PATENT DOCUMENTS 6,483,452 B1  11/2002 Iwakini
7,808,422 B1 * 10/2010 Woodell ................ G01S 13/953
                                                    342/26 B
(Continued)

FOREIGN PATENT DOCUMENTS

JP  2002-006033 A  1/2002
JP  2003-049702 A  2/2003
(Continued)

*Primary Examiner* — Qutbuddin Ghulamali
(74) *Attorney, Agent, or Firm* — Studebaker & Brackett PC

(57) ABSTRACT

An electronic device includes a transmission antenna that transmits a transmission wave, a reception antenna that receives a reflected wave that is the reflected transmission wave, and a control unit that detects an object that reflects the transmission wave, based on a transmission signal transmitted as the transmission wave and a reception signal received as the reflected wave. The electronic device transmits, to an information processing apparatus, sensing information based on the transmission signal and the reception signal at a location of the electronic device along with location information of the electronic device.

13 Claims, 12 Drawing Sheets

(51) Int. Cl.
*G01S 7/02* (2006.01)
*G01S 13/44* (2006.01)
*G01S 13/58* (2006.01)
*G01S 13/86* (2006.01)
*G01S 17/931* (2020.01)
*G01S 13/931* (2020.01)

(52) U.S. Cl.
CPC ............ *G01S 13/584* (2013.01); *G01S 13/86* (2013.01); *G01S 17/931* (2020.01); *G01S 2013/9316* (2020.01); *G01S 2013/9323* (2020.01)

(56) References Cited

U.S. PATENT DOCUMENTS

| | | |
|---|---|---|
| 8,427,361 B2 | 4/2013 | Sato |
| 2015/0331098 A1* | 11/2015 | Luebbert ................. G01S 7/354 342/91 |
| 2016/0007147 A1* | 1/2016 | Zhang ................. H04W 64/006 455/456.1 |
| 2016/0037361 A1* | 2/2016 | Maguire .............. H04B 17/309 455/73 |
| 2016/0066154 A1* | 3/2016 | Shin ................... G06Q 30/0267 455/456.1 |
| 2016/0124084 A1 | 5/2016 | Lim et al. |

FOREIGN PATENT DOCUMENTS

| | | |
|---|---|---|
| JP | 2006-010410 A | 1/2006 |
| JP | 2007-107912 A | 4/2007 |
| JP | 2011-220856 A | 11/2011 |
| JP | 2012-058018 A | 3/2012 |
| JP | 2014-009947 A | 1/2014 |

\* cited by examiner

FIG. 15

| LOCATION | TIME SLOT | TIME OF YEAR | STATISTICAL INFORMATION | PARAMETER ADJUSTMENT VALUE | PARAMETER |
|---|---|---|---|---|---|
| a | 00:00–08:00 | JANUARY TO APRIL | X1 | Y1 | Z1 |
| a | 08:00–16:00 | MAY TO AUGUST | X2 | Y2 | Z2 |
| a | 16:00–24:00 | SEPTEMBER TO DECEMBER | X3 | Y3 | Z3 |
| b | ... | ... | ... | ... | ... |
| b | ... | ... | ... | ... | ... |
| b | ... | ... | ... | ... | ... |
| ... | | | | | |

DB1501

D1, D2, D3, D4, D5, D6

ELECTRONIC DEVICE, INFORMATION PROCESSING APPARATUS, METHOD, PROGRAM, AND DATA STRUCTURE

CROSS-REFERENCE TO RELATED APPLICATIONS

This application claims priority from Japanese Patent Application No. 2019-83109 filed in Japan on Apr. 24, 2019, the entire disclosure of which is incorporated herein by reference.

TECHNICAL FIELD

The present disclosure relates to an electronic device, an information processing apparatus, a method, a program, and a data structure.

BACKGROUND ART

For example, in fields such as automobile-related industries, a technology for measuring a distance or the like between a vehicle of interest and a predetermined object is regarded as important. In recent years, various studies have been conducted particularly on a radar (Radio Detecting and Ranging) technology for measuring a distance or the like to an object such as an obstacle by transmitting a radio wave such as a millimeter wave and receiving a reflected wave reflected off the object. Such a technology for measuring a distance or the like expectedly becomes more important in the future with progresses of a technology for assisting drivers in driving and a technology related to automated driving for partially or entirely automating driving.

In recent years, a technology allowing a vehicle such as an automobile to communicate various kinds of information with an external apparatus has also been proposed. For example, PTL 1 discloses that environmental data obtained as a result of an automobile traveling and learning data obtained as a result of the automobile being operated are transmitted to an external server. Recently, the technology allowing a vehicle such as an automobile to communicate with an external apparatus has been becoming more important with a progress of a technology such as a connected car, for example.

CITATION LIST

Patent Literature

PTL 1: Japanese Unexamined Patent Application Publication No. 2003-49702

SUMMARY OF INVENTION

An electronic device according to one embodiment includes a transmission antenna that transmits a transmission wave, a reception antenna that receives a reflected wave that is the reflected transmission wave, and a control unit that detects an object that reflects the transmission wave, based on a transmission signal transmitted as the transmission wave and a reception signal received as the reflected wave.

The electronic device transmits, to an information processing apparatus, sensing information based on the transmission signal and the reception signal at a location of the electronic device along with location information of the electronic device.

An information processing apparatus according to one embodiment communicates with an electronic device that detects, based on a transmission signal transmitted as a transmission wave and a reception signal received as a reflected wave that is the reflected transmission wave, an object that reflects the transmission wave.

The information processing apparatus includes a reception unit that receives, from the electronic device, sensing information based on at least one of the transmission signal and the reception signal at a location of the electronic device along with location information of the electronic device,
  a control unit that performs statistical processing on the sensing information obtained at the location of the electronic device to generate statistical information, and generates, in accordance with the statistical information, a parameter to be used in determining whether the object is detected by the electronic device, and
  a transmission unit that transmits the parameter generated by the control unit to the electronic device.

An information processing apparatus according to one embodiment communicates with an electronic device that detects, based on a transmission signal transmitted as a transmission wave and a reception signal received as a reflected wave that is the reflected transmission wave, an object that reflects the transmission wave.

The information processing apparatus includes
  a reception unit that receives, from the electronic device, sensing information based on at least one of the transmission signal and the reception signal at a location of the electronic device along with location information of the electronic device,
  a control unit that performs statistical processing on the sensing information obtained at the location of the electronic device to generate statistical information, and
  a transmission unit that transmits the statistical information generated by the control unit to the electronic device.

A data structure according to one embodiment is a data structure for use in generating a parameter for used in determining whether an object is detected by an electronic device.

The electronic device includes
  a transmission antenna that transmits a transmission wave,
  a reception antenna that receives a reflected wave that is the reflected transmission wave, and
  a control unit that detects an object that reflects the transmission wave, based on a transmission signal transmitted as the transmission wave and a reception signal received as the reflected wave.

The data structure includes
location information of the electronic device, and
statistical information based on at least one of the transmission signal and the reception signal associated with the location information of the electronic device.

The parameter is generated based on the statistical information.

A method according to one embodiment includes
  a step of transmitting a transmission wave from a transmission antenna;
  a step of receiving, from a reception antenna, a reflected wave that is the reflected transmission wave;
  a step of detecting an object that reflects the transmission wave, based on a transmission signal transmitted as the transmission wave and a reception signal received as the reflected wave; and a step of transmitting, to an information processing apparatus, sensing information based on at least one of the transmission signal and the reception signal at a location of a device along with location information of the device.

A program according to one embodiment causes a computer to perform:

a step of transmitting a transmission wave from a transmission antenna;

a step of receiving, from a reception antenna, a reflected wave that is the reflected transmission wave;

a step of detecting an object that reflects the transmission wave, based on a transmission signal transmitted as the transmission wave and a reception signal received as the reflected wave; and a step of transmitting, to an information processing apparatus, sensing information based on at least one of the transmission signal and the reception signal at a location of the computer along with location information of the computer.

BRIEF DESCRIPTION OF DRAWINGS

FIG. 15 is a conceptual diagram of a database according to the first embodiment.

DESCRIPTION OF EMBODIMENTS

The detection accuracy is desirably improved in a technology for detecting a predetermined object by receiving a reflected wave that is a transmitted transmission wave reflected off the object. The present disclosure relates to providing an electronic device, an information processing apparatus, a method, a program, and a data structure that contribute to improvement of the object detection accuracy. According to one embodiment, an electronic device, an information processing apparatus, a method, a program, and a data structure that contribute to improvement of the object detection accuracy can be provided. Some embodiments are described in detail below with reference with the drawings.

First Embodiment

An electronic device according to a first embodiment is mounted in a vehicle (mobility device) such as an automobile, for example, and thus is capable of detecting a predetermined object located around the mobility device. To this end, the electronic device according to the first embodiment is capable of transmitting a transmission wave to an area around the mobility device from a transmission antenna installed on the mobility device. The electronic device according to the first embodiment is also capable of receiving a reflected wave that is the reflected transmission wave, from a reception antenna installed on the mobility device. At least one of the transmission antenna and the reception antenna may be included in a radar sensor or the like installed on the mobility device, for example.

A configuration in which the electronic device according to the first embodiment is mounted in an automobile such as a passenger car is described below as a typical example. However, the mobility device in which the electronic device according to the first embodiment is mounted is not limited to an automobile. The electronic device according to the first embodiment may be mounted in various mobility devices such as a bus, a track, a motorcycle, a bicycle, a ship, an aircraft, a farm vehicle such as a tractor, a snowplow, a garbage truck, a police car, an ambulance, and a drone. The mobility device in which the electronic device according to the first embodiment is mounted is not necessarily limited to a mobility device that moves by its own motive power. For example, the mobility device in which the electronic device according to the first embodiment is mounted may be a trailer towed by a tractor. The electronic device according to the first embodiment is capable of measuring a distance or the like between a sensor and a predetermined object when at least one of the sensor and the object is movable. The electronic device according to the first embodiment is also capable of measuring the distance or the like between the sensor and the object even when both the sensor and the object are stationary.

An example of how the electronic device according to the first embodiment detects an object is described first.

Figure 1:
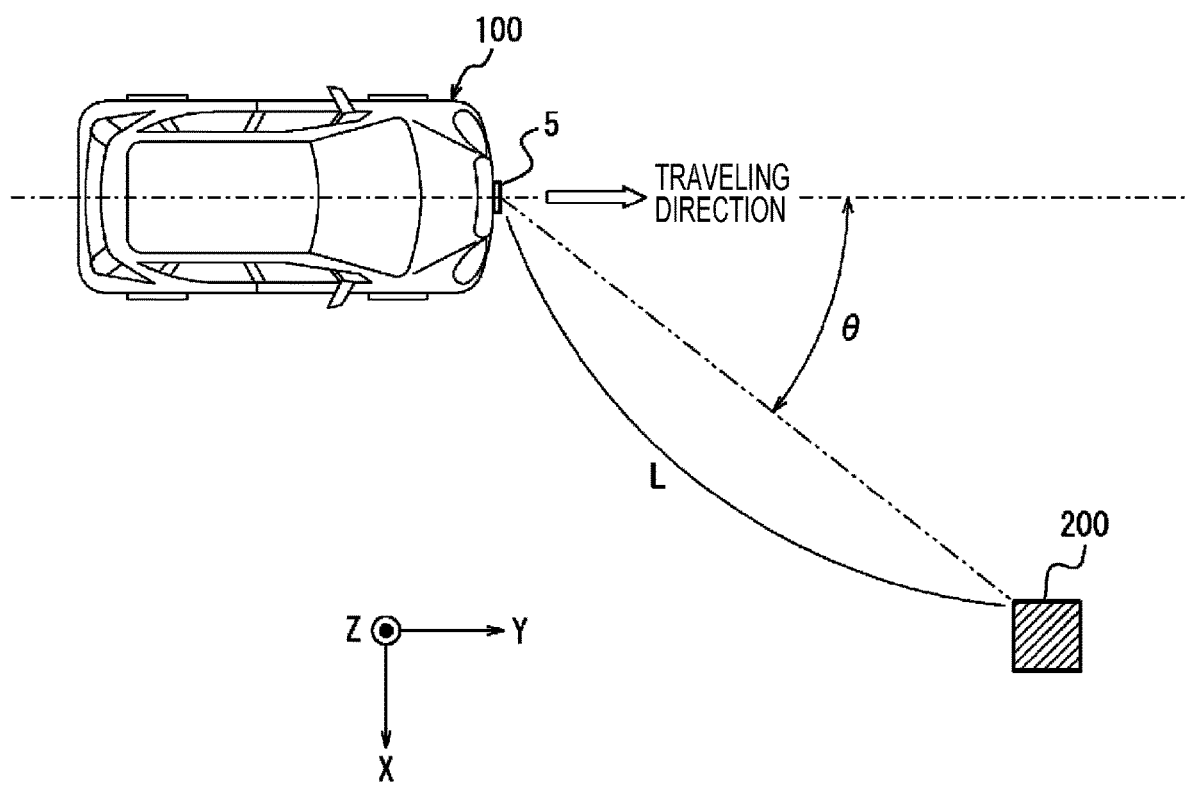
FIG. 1 is a diagram for describing how an electronic device according to a first embodiment is used.

FIG. 1 is a diagram for describing how the electronic device according to the first embodiment is used. FIG. 1 illustrates an example in which a sensor including a transmission antenna and a reception antenna according to the first embodiment is installed on a mobility device.

A sensor 5 including a transmission antenna and a reception antenna according to the first embodiment is installed on a mobility device 100 illustrated in FIG. 1. It is assumed that an electronic device 1 according to the first embodiment is also mounted (for example, built) in the mobility device 100 illustrated in FIG. 1. A specific configuration of the electronic device 1 is described later. The sensor 5 may include at least one of the transmission antenna and the reception antenna, for example. The sensor 5 may also appropriately include at least any of other functional units, such as at least part of a control unit 10 (FIG. 2) included in the electronic device 1. The mobility device 100 illustrated in FIG. 1 may be an automotive vehicle such as a passenger car but may be a mobility device of any type. In FIG. 1, the mobility device 100 may move (travel or slowly travel), for example, in a positive Y-axis direction (traveling direction) or in another direction, or may be stationary without moving.

As illustrated in FIG. 1, the sensor 5 including the transmission antenna is installed on the mobility device 100. In the example illustrated in FIG. 1, only one sensor 5 including the transmission antenna and the reception antenna is installed at a front portion of the mobility device 100. The position where the sensor 5 is installed on the mobility device 100 is not limited to the position illustrated in FIG. 1 and may be another appropriate position. For example, the sensor 5 illustrated in FIG. 1 may be installed on a left side, on a right side, and/or on a rear side of the mobility device 100. The number of such sensors 5 may be any number equal to or greater than 1 depending on various conditions (or requirements) such as a range and/or an accuracy of measurement performed by the mobility device 100. The sensor 5 may be installed inside the mobility device 100. The inside the mobility device 100 may be, for example, a space inside a bumper, a space inside a body, a space inside a headlight, or a space such as a driver's space.

The sensor 5 transmits an electromagnetic wave as a transmission wave from the transmission antenna. For example, when a predetermined object (for example, an object 200 illustrated in FIG. 1) is located around the mobility device 100, at least part of the transmission wave transmitted from the sensor 5 is reflected off the object to become a reflected wave. For example, the reception antenna of the sensor 5 receives such a reflected wave. In this manner, the electronic device 1 mounted in the mobility device 100 can detect the object.

The sensor 5 including the transmission antenna may be typically a radar (Radio Detecting and Ranging) sensor that transmits and receives a radio wave. However, the sensor 5 is not limited to a radar sensor. The sensor 5 according to the first embodiment may be, for example, a sensor based on LIDAR (Light Detection and Ranging, Laser Imaging Detection and Ranging) technology that uses an optical wave. Each of these sensors can include, for example, a patch antenna. Since the technologies such as RADAR and LIDAR are already known, detailed description may be appropriately simplified or omitted.

The electronic device 1 mounted in the mobility device 100 illustrated in FIG. 1 receives, from the reception antenna, the reflected wave of the transmission wave transmitted from the transmission antenna of the sensor 5. In this manner, the electronic device 1 can detect the predetermined object 200 located within a predetermined distance from the mobility device 100. For example, as illustrated in FIG. 1, the electronic device 1 can measure a distance L between the mobility device 100, which is a vehicle of interest, and the predetermined object 200. The electronic device 1 can also measure a relative velocity between the mobility device 100, which is the vehicle of interest, and the predetermined object 200. The electronic device 1 can further measure a direction (an angle of arrival A) from which the reflected wave from the predetermined object 200 arrives at the mobility device 100, which is the vehicle of interest.

The object 200 may be, for example, at least any of an oncoming automobile traveling in a lane adjacent to a lane of the mobility device 100, an automobile traveling side by side with the mobility device 100, an automobile traveling in front of or behind the mobility device 100 in the same lane, and the like. The object 200 may also be any object located around the mobility device 100, such as a motorcycle, a bicycle, a stroller, a person such as a pedestrian, an animal, an insect, other forms of life, a guardrail, a median strip, a road sign, a step on a sidewalk, a wall, or an obstacle. The object 200 may be in motion or stationary. For example, the object 200 may be an automobile or the like that is parked or stationary around the mobility device 100.

In FIG. 1, a ratio between a size of the sensor 5 and a size of the mobility device 100 does not necessarily indicate an actual ratio. FIG. 1 illustrates the sensor 5 in a state of being installed on an outer portion of the mobility device 100. However, in the first embodiment, the sensor 5 may be installed at various positions of the mobility device 100. For example, in the first embodiment, the sensor 5 may be installed inside a bumper of the mobility device 100 so as not to be seen in the appearance of the mobility device 100.

Description is given below on the assumption that the transmission antenna of the sensor 5 transmits a radio wave in a frequency band, such as a millimeter wave (equal to or higher than 30 GHz) or a quasi-millimeter wave (for example, around 20 GHz to 30 GHz) as a typical example. For example, the transmission antenna of the sensor 5 may transmit a radio wave having a frequency bandwidth of 4 GHz such as from 77 GHz to 81 GHz.

Figure 2:
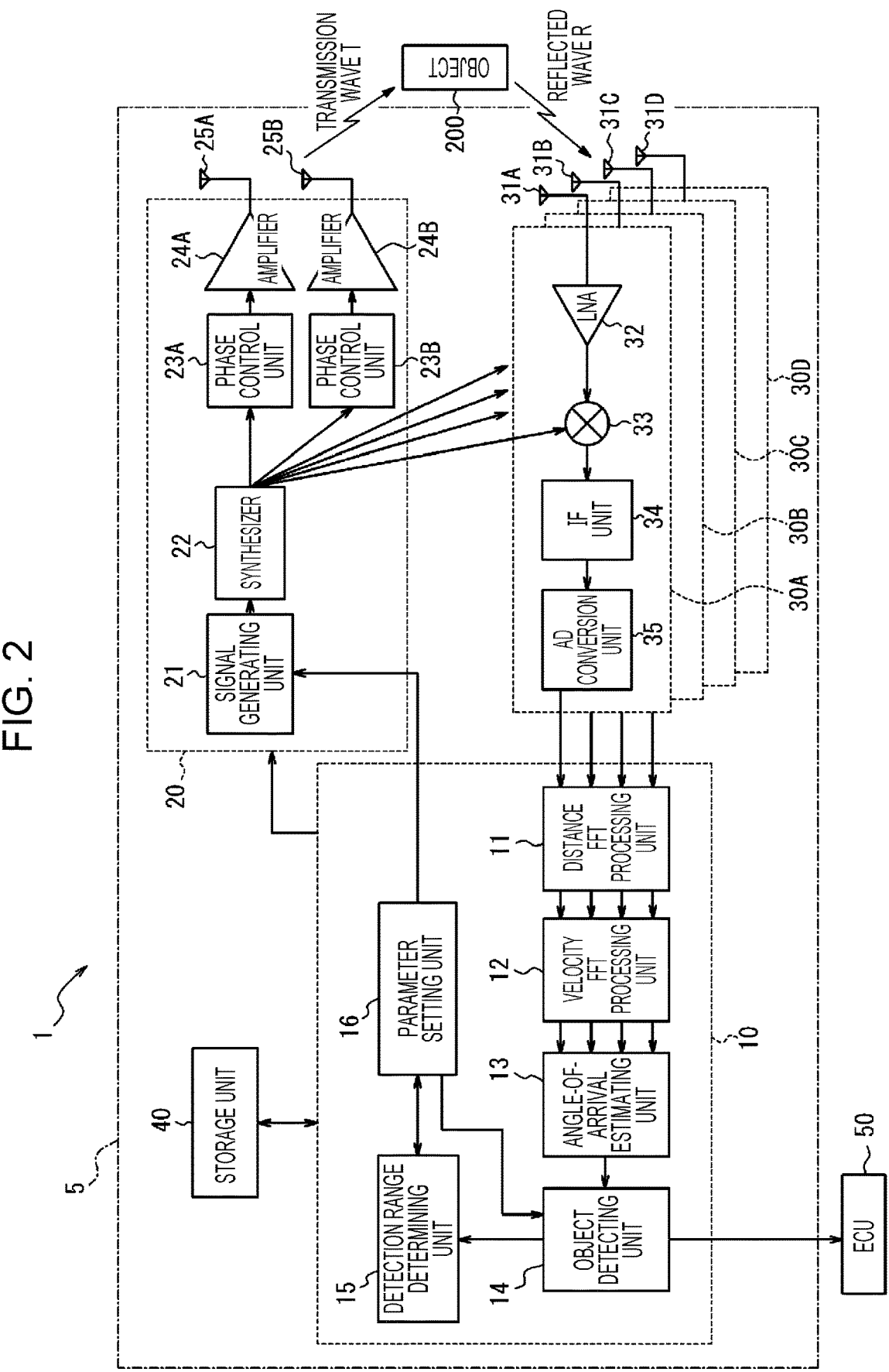
FIG. 2 is a functional block diagram schematically illustrating a configuration of the electronic device according to the first embodiment.

FIG. 2 is a functional block diagram schematically illustrating an example of a configuration of the electronic device 1 according to the first embodiment. An example of the configuration of the electronic device 1 according to the first embodiment is described below.

When a distance or the like is measured by using a millimeter-wave radar, a frequency-modulated continuous wave radar (hereinafter, referred to as an FMCW radar) is often used. The FMCW radar sweeps a frequency of a to-be-transmitted radio wave to generate a transmission signal. Thus, a frequency of the radio wave used by such a millimeter-wave FMCW radar, which uses a radio wave of a frequency band of 79 GHz, for example, has a frequency bandwidth of 4 GHz such as from 77 GHz to 81 GHz, for example. The radar of the frequency bandwidth of 79 GHz has a characteristic that the usable frequency bandwidth is wider than another millimeter-wave and/or quasi-millimeter-wave radar of a frequency band of 24 GHz, 60 GHz, or 76 GHz, for example. Such embodiments are described below.

As illustrated in FIG. 2, the electronic device 1 according to the first embodiment is constituted by the sensor 5 and an ECU (Electronic Control Unit) 50. The ECU 50 controls various operations of the mobility device 100. The ECU 50 may be constituted by at least one or more ECUs. The electronic device 1 according to the first embodiment includes the control unit 10. The electronic device 1 according to the first embodiment may also appropriately include another functional unit such as at least any of a transmission unit 20, reception units 30A to 30D, and a storage unit 40. As illustrated in FIG. 2, the electronic device 1 may include a plurality of reception units such as the reception units 30A to 30D. When the reception units 30A, 30B, 30C, and 30D are not distinguished from one another, the reception units 30A, 30B, 30C, and 30D are simply referred to as "reception units 30" below.

The control unit 10 may include a distance FFT processing unit 11, a velocity FFT processing unit 12, an angle-of-arrival estimating unit 13, an object detecting unit 14, a detection range determining unit 15, and a parameter setting unit 16. These functional units included in the control unit 10 are further described later.

As illustrated in FIG. 2, the transmission unit 20 may include a signal generating unit 21, a synthesizer 22, phase control units 23A and 23B, amplifiers 24A and 24B, and transmission antennas 25A and 25B. When the phase control units 23A and 23B are not distinguished from each other, the phase control units 23A and 23B are simply referred to as "phase control units 23" below. When the amplifiers 24A and 24B are not distinguished from each other, the amplifiers 24A and 24B are simply referred to as "amplifiers 24" below. When the transmission antennas 25A and 25B are not distinguished from each other, the transmission antennas 25A and 25B are simply referred to as "transmission antennas 25" below.

As illustrated in FIG. 2, each of the reception units 30 may include a respective one of reception antennas 31A to 31D. When the reception antennas 31A, 31B, 31C, and 31D are not distinguished from one another, the reception antennas 31A, 31B, 31C, and 31D are simply referred to as "reception antennas 31" below. As illustrated in FIG. 2, each of the plurality of reception units 30 may include an LNA 32, a mixer 33, an IF unit 34, and an AD conversion unit 35. The reception units 30A to 30D may have the same and/or similar configuration. FIG. 2 schematically illustrates the configuration of only the reception unit 30A as a representative example.

The sensor 5 described above may include, for example, the transmission antennas 25 and the reception antennas 31. The sensor 5 may also appropriately include at least any of other functional units such as the control unit 10.

The control unit 10 included in the electronic device 1 according to the first embodiment is capable of controlling various functional units of the electronic device 1 and also controlling operations of the entire electronic device 1. To provide control and processing capabilities for executing various functions, the control unit 10 may include at least one processor, for example, a CPU (Central Processing Unit). The control unit 10 may be collectively implemented by one processor, may be implemented by some processors, or may be implemented discrete individual processors. The processor may be implemented as one IC. The IC is also referred to as an integrated circuit. The processor may be implemented as a plurality of ICs and discrete circuits connected to be able to perform communication. The processor may be implemented on the basis of various other known technologies. In the first embodiment, the control unit 10 may be configured as, for example, a CPU and a program executed by the CPU. The control unit 10 may appropriately include a memory required for operations of the control unit 10.

The storage unit 40 may store a program executed by the control unit 10, a result of processing performed by the control unit 10, etc. The storage unit 40 may function as a work memory of the control unit 10. The storage unit 40 may be constituted, for example, by a semiconductor memory, a magnetic disk, or the like. However, the storage unit 40 is not limited to these, and can be any storage device. The storage unit 40 may be, for example, a storage medium such as a memory card inserted to the electronic device 1 according to the present embodiment. The storage unit 40 may be an internal memory of the CPU used as the control unit 10 as described above.

In the first embodiment, the storage unit 40 may store various parameters for setting a range in which an object is detected on the basis of a transmission wave T transmitted from the transmission antenna 25 and a reflected wave R received from the reception antenna 31. Such parameters are further described later.

In the electronic device 1 according to the first embodiment, the control unit 10 is capable of controlling at least one of the transmission unit 20 and the reception units 30. In this case, the control unit 10 may control at least one of the transmission unit 20 and the reception units 30 on the basis of various kinds of information stored in the storage unit 40. In the electronic device 1 according to the first embodiment, the control unit 10 may instruct the signal generating unit 21 to generate a signal or may control the signal generating unit 21 to generate a signal.

In accordance with control performed by the control unit 10, the signal generating unit 21 generates a signal (transmission signal) to be transmitted as the transmission wave T from each of the transmission antennas 25. When generating the transmission signal, the signal generating unit 21 may allocate a frequency of the transmission signal in accordance with control performed by the control unit 10, for example. Specifically, the signal generating unit 21 may allocate a frequency of the transmission signal in accordance with a parameter set by the parameter setting unit 16. For example, the signal generating unit 21 receives frequency information from the control unit 10 (the parameter setting unit 16) and generates a signal having a predetermined frequency in a frequency band such as from 77 GHz to 81 GHz, for example. The signal generating unit 21 may include a functional unit such as a voltage control oscillator (VCO), for example.

The signal generating unit 21 may be configured as hardware having the function, as a microcomputer for example, or as a processor such as a CPU and a program or the like executed by the processor for example. Each functional unit described below may also be configured as hardware having the function, as a microcomputer for example if possible, or as a processor such as a CPU and a program or the like executed by the processor for example.

In the electronic device 1 according to the first embodiment, the signal generating unit 21 may generate a transmission signal (transmission chirp signal) such as a chirp signal, for example. In particular, the signal generating unit 21 may generate a signal (linear chirp signal) whose frequency changes linearly and periodically. For example, the signal generating unit 21 may generate a chirp signal whose frequency linearly and periodically increases from 77 GHz to 81 GHz as time elapses. For example, the signal generating unit 21 may generate a signal whose frequency periodically repeats a linear increase (up-chirp) from 77 GHz to 81 GHz and a decrease (down-chirp) as time elapses. The signal to be generated by the signal generating unit 21 may be set in advance by the control unit 10, for example. The signal generated by the signal generating unit 21 may be stored in advance in the storage unit 40 or the like, for example. Since chirp signals used in a technical field such as a radar are known, more detailed description is appropriately simplified or omitted. The signal generated by the signal generating unit 21 is supplied to the synthesizer 22.

Figure 3:
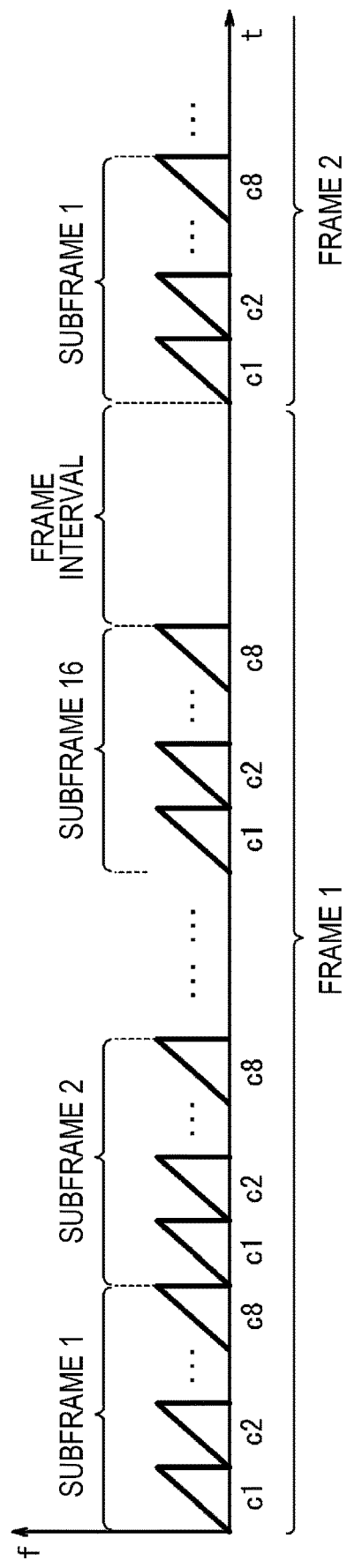
FIG. 3 is a diagram for describing a configuration of a transmission signal according to the first embodiment.

FIG. 3 is a diagram for describing an example of chirp signals generated by the signal generating unit 21.

In FIG. 3, the horizontal axis represents an elapsed time and the vertical axis represents a frequency. In the example illustrated in FIG. 3, the signal generating unit 21 generates linear chirp signals whose frequency linearly changes periodically. In FIG. 3, the individual chirp signals are denoted by c1, c2, . . . , c8. As illustrated in FIG. 3, the frequency of each chirp signal linearly increases as time elapses.

In the example illustrated in FIG. 3, eight chirp signals c1, c2, . . . , c8 constitute one subframe. That is, each of subframes such as a subframe 1 and a subframe 2 illustrated in FIG. 3 includes eight chirp signals c1, c2, ..., c8. In the example illustrated in FIG. 3, 16 subframes such as the subframes 1 to 16 constitute one frame. That is, each of frames such as a frame 1 and a frame 2 illustrated in FIG. 3 includes 16 subframes. As illustrated in FIG. 3, a frame interval of a predetermined length may be included between frames. One frame illustrated in FIG. 3 may have a length of about 30 ms to 50 ms, for example. One frame illustrated in FIG. 3 may have a length of about 30 ms to 50 ms, for example.

In FIG. 3, the frame 2 and subsequent frames may have the same and/or similar configuration. In FIG. 3, the frame 3 and subsequent frames may have the same and/or similar configuration. In the electronic device 1 according to the first embodiment, the signal generating unit 21 may generate a transmission signal as any number of frames. In FIG. 3, an illustration of some chirp signals is omitted. As described above, a relationship between time and a frequency of the transmission signal generated by the signal generating unit 21 may be stored in the storage unit 40 or the like, for example.

As described above, the electronic device 1 according to the first embodiment may transmit a transmission signal constituted by subframes each including a plurality of chirp signals. The electronic device 1 according to the first embodiment may transmit a transmission signal constituted by frames each including a predetermined number of subframes.

Description is given below on the assumption that the electronic device 1 transmits a transmission signal having a frame structure illustrated in FIG. 3. However, the frame structure illustrated in FIG. 3 is an example. For example, the number of chirp signals included in one subframe is not limited to eight. In the first embodiment, the signal generating unit 21 may generate a subframe including any number (for example, a plurality) of chirp signals. A subframe structure illustrated in FIG. 3 is also an example. For example, the number of subframes included in one frame is not limited to 16. In the first embodiment, the signal generating unit 21 may generate a frame including any number (for example, a plurality) of subframes. The signal generating unit 21 may generate signals having different frequencies. The signal generating unit 21 may generate a plurality of discrete signals of bandwidths in which frequencies f are different from each other.

Referring back to FIG. 2, the synthesizer 22 increases the frequency of the signal generated by the signal generating unit 21 to a frequency in a predetermined frequency band. The synthesizer 22 may increase the frequency of the signal generated by the signal generating unit 21 to a frequency selected as a frequency of the transmission wave T to be transmitted from each of the transmission antennas 25. The frequency selected as the frequency of the transmission wave T to be transmitted from each of the transmission antennas 25 may be set by the control unit 10, for example. For example, the frequency selected as the frequency of the transmission wave T to be transmitted from each of the transmission antennas 25 may be a frequency selected by the parameter setting unit 16. The frequency selected as the frequency of the transmission wave T to be transmitted from each of the transmission antennas 25 may be stored in the storage unit 40, for example. The signal whose frequency has been increased by the synthesizer 22 is supplied to the phase control unit 23 and the mixer 33. When the plurality of phase control units 23 are present, the signal whose frequency has been increased by the synthesizer 22 may be supplied to each of the plurality of phase control units 23.

When the plurality of reception units 30 are present, the signal whose frequency has been increased by the synthesizer 22 may be supplied to each of the mixers 33 of the plurality of reception units 30.

Each of the phase control units 23 controls a phase of the transmission signal supplied from the synthesizer 22. Specifically, for example, in accordance with control performed by the control unit 10, each of the phase control units 23 may appropriately advance or delay the phase of the signal supplied from the synthesizer 22 to adjust the phase of the transmission signal. In this case, on the basis of a difference between paths of the transmission waves T to be transmitted from the plurality of transmission antennas 25, the phase control units 23 may adjust the phases of the respective transmission signals. The phase control units 23 appropriately adjust the phases of the respective transmission signals. Consequently, the transmission waves T transmitted from the plurality of transmission antennas 25 enhance with each other in a predetermined direction to form a beam (beamforming). In this case, a correlation between a direction of beamforming and amounts of phase by which the respective transmission signals transmitted by the plurality of transmission antennas 25 are controlled may be stored in the storage unit 40, for example. The transmission signal whose phase is controlled by each of the phase control units 23 is supplied to a respective one of the amplifiers 24.

Each of the amplifiers 24 amplifies power (electric power) of the transmission signal supplied from a respective one of the phase control units 23 in accordance with control performed by the control unit 10, for example. When the sensor 5 includes the plurality of transmission antennas 25, each of the plurality of amplifiers 24 may amplify power (electric power) of the transmission signal supplied from a respective one of the plurality of phase control units 23 in accordance with control performed by the control unit 10, for example. Since the technology for amplifying power of a transmission signal is already known, more detailed description is omitted. Each of the amplifiers 24 is connected to a respective one of the transmission antennas 25.

The transmission antenna 25 outputs (transmits), as the transmission wave T, the transmission signal amplified by the amplifier 24. When the sensor 5 includes the plurality of transmission antennas 25, each of the plurality of transmission antennas 25 may output (transmit), as the transmission wave T, the transmission signal amplified by a respective one of the plurality of amplifiers 24. Since the transmission antennas 25 can be configured in the same and/or similar manner as transmission antennas for use in the known radar technology, more detailed description is omitted.

The electronic device 1 according to the first embodiment, which includes the transmission antennas 25, is capable of transmitting transmission signals (for example, transmission chirp signals) as the transmission waves T from the respective transmission antennas 25 in this manner. At least one of the functional units constituting the electronic device 1 may be housed in one housing. In this case, the one housing may have a hard-to-open structure. For example, the transmission antennas 25, the reception antennas 31, and the amplifiers 24 are desirably housed in one housing, and this housing desirably has a hard-to-open structure. When the sensor 5 is installed on the mobility device 100 such as an automobile, each of the transmission antennas 25 may transmit the transmission wave T to outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. The transmission antennas 25 are covered with a member such as the radar cover, so that a risk of the transmission antennas 25 being damaged or malfunctioning because of a contact with an external object can be reduced. The radar cover and the housing may also be referred to as a radome.

FIG. 2 illustrates an example in which the electronic device 1 includes two transmission antennas 25. However, in the first embodiment, the electronic device 1 may include any number of transmission antennas 25. On the other hand, in the first embodiment, the electronic device 1 may include a plurality of transmission antennas 25 in the case where the transmission waves T transmitted from the respective transmission antennas 25 form a beam in a predetermined direction. In the first embodiment, the electronic device 1 may include a plurality of transmission antennas 25. In this case, the electronic device 1 may include the plurality of phase control units 23 and the plurality of amplifiers 24 to correspond to the plurality of transmission antennas 25. Each of the plurality of phase control units 23 may control the phase of a respective one of the plurality of transmission waves supplied from the synthesizer 22 and to be transmitted from the plurality of transmission antennas 25. Each of the plurality of amplifiers 24 may amplify power of a respective one of the plurality of transmission signals to be transmitted from the plurality of transmission antennas 25. In this case, the sensor 5 may include the plurality of transmission antennas. As described above, when the electronic device 1 illustrated FIG. 2 includes the plurality of transmission antennas 25, the electronic device 1 may include a plurality of functional units necessary for transmitting the transmission waves T from the plurality of transmission antennas 25.

Each of the reception antennas 31 receives the reflected wave R. The reflected wave R is the transmission wave T reflected off the predetermined object 200. The reception antennas 31 may include a plurality of antennas such as the reception antennas 31A to 31D, for example. Since the reception antennas 31 can be configured in the same and/or similar manner as reception antennas for use in the known radar technology, more detailed description is omitted. Each of the reception antennas 31 is connected to the LNA 32. A reception signal based on the reflected wave R received by each of the reception antennas 31 is supplied to the LNA 32.

The electronic device 1 according to the first embodiment can receive, from each of the plurality of reception antennas 31, the reflected wave R that is the transmission wave T that has been transmitted as the transmission signal such as a chirp signal (transmission chirp signal), for example, and has been reflected off the predetermined object 200. When the transmission chirp signal is transmitted as the transmission wave T in this manner, the reception signal based on the received reflected wave R is referred to as a reception chirp signal. That is, the electronic device 1 receives the reception signal (for example, the reception chirp signal) as the reflected wave R from each of the reception antennas 31. When the sensor 5 is installed on the mobility device 100 such as an automobile, each of the reception antennas 31 may receive the reflected wave R from outside the mobility device 100 through a cover member such as a radar cover, for example. In this case, the radar cover may be made of a material, for example, a synthetic resin or rubber, that allows an electromagnetic wave to pass therethrough. This radar cover may also serve as a housing of the sensor 5, for example. The reception antennas 31 are covered with a member such as the radar cover, so that a risk of the reception antennas 31 being damaged or malfunctioning because of a contact with an external object can be reduced. The radar cover and the housing may also be referred to as a radome.

When the reception antennas 31 are installed near the transmission antennas 25, these may be collectively included in one sensor 5. That is, for example, one sensor 5 may include at least one transmission antenna 25 and at least one reception antenna 31. For example, one sensor 5 may include the plurality of transmission antennas 25 and the plurality of reception antennas 31. In such a case, one radar sensor may be covered with a cover member such as one radar cover, for example.

The LNA 32 amplifies, with low noise, the reception signal based on the reflected wave R received by a respective one of the reception antennas 31. The LNA 32 may be a low-noise amplifier and amplifies, with low noise, the reception signal supplied from a respective one of the reception antennas 31. The reception signal amplified by the LNA 32 is supplied to the mixer 33.

The mixer 33 mixes (multiplies) the reception signal having an RF frequency supplied from the LNA 32 and the transmission signal supplied from the synthesizer 22 to generate a beat signal. The beat signal obtained by the mixer 33 through mixing is supplied to the IF unit 34.

The IF unit 34 performs frequency conversion on the beat signal supplied from the mixer 33 to reduce the frequency of the beat signal to an intermediate frequency (IF). The beat signal whose frequency has been reduced by the IF unit 34 is supplied to the AD conversion unit 35.

The AD conversion unit 35 digitizes the analog beat signal supplied from the IF unit 34. The AD conversion unit 35 may be constituted by any analog-to-digital conversion circuit (Analog to Digital Converter (ADC)). The digitized beat signal obtained by the AD conversion unit 35 is supplied to the distance FFT processing unit 11 of the control unit 10. In the case where there are the plurality of reception units 30, the beat signals each digitized by a respective one of the plurality of AD conversion units 35 may be supplied to the distance FFT processing unit 11.

The distance FFT processing unit 11 estimates a distance between the mobility device 100 equipped with the electronic device 1 and the object 200 on the basis of the beat signals supplied from the respective AD conversion units 35. The distance FFT processing unit 11 may include a processing unit that performs fast Fourier transform, for example. In this case, the distance FFT processing unit 11 may be configured as any circuit, any chip, or the like that performs fast Fourier transform (FFT) processing.

The distance FFT processing unit 11 performs FFT processing (hereinafter, appropriately referred to as "distance FFT processing") on the beat signal that has been digitized by each of the AD conversion units 35. For example, the distance FFT processing unit 11 may perform the FFT processing on a complex signal supplied from each of the AD conversion units 35. The beat signal that has been digitized by each of the AD conversion units 35 can be represented as a temporal change in signal intensity (power). The distance FFT processing unit 11 performs FFT processing on such a beat signal, so that the beat signal can be represented as signal intensity (power) for each frequency. If a peak in a result obtained by the distance FFT processing is equal to or greater than a predetermined threshold, the distance FFT processing unit 11 may determine that the predetermined object 200 is located at the distance corresponding to the peak. For example, a constant false alarm rate (CFAR) detection process is known as a method for determining that an object (reflecting object) that reflects a transmission wave is located when a peak value that is equal to or greater than a threshold is detected from the average power or amplitude of a disturbance signal.

As described above, the electronic device 1 according to the first embodiment can detect the object 200 that reflects the transmission wave T on the basis of the transmission signal transmitted as the transmission wave T and the reception signal received as the reflected wave R.

The distance FFT processing unit 11 can estimate a distance to a predetermined object on the basis of one chirp signal (for example, c1 illustrated in FIG. 3). That is, the electronic device 1 can measure (estimate) the distance L illustrated in FIG. 1 by performing the distance FFT processing. Since a technique for measuring (estimating) a distance to a predetermined object by performing FFT processing on a beat signal is known, more detailed description is appropriately simplified or omitted. Results (for example, distance information) of the distance FFT processing performed by the distance FFT processing unit 11 may be supplied to the velocity FFT processing unit 12. The results of the distance FFT processing performed by the distance FFT processing unit 11 may also be supplied to the object detecting unit 14.

The velocity FFT processing unit 12 estimates a relative velocity between the mobility device 100 equipped with the electronic device 1 and the object 200 on the basis of the beat signals on which the distance FFT processing has been performed by the distance FFT processing unit 11. The velocity FFT processing unit 12 may include a processing unit that performs fast Fourier transform, for example. In this case, the velocity FFT processing unit 12 may be configured by any circuit, any chip, or the like that performs fast Fourier transform (FFT) processing.

The velocity FFT processing unit 12 further performs FFT processing (hereinafter, appropriately referred to as "velocity FFT processing") on each beat signal on which the distance FFT processing has been performed by the distance FFT processing unit 11. For example, the velocity FFT processing unit 12 may perform the FFT processing on each complex signal supplied from the distance FFT processing unit 11. The velocity FFT processing unit 12 can estimate a relative velocity to the predetermined object on the basis of a subframe (for example, the subframe 1 illustrated in FIG. 3) including chirp signals. When the distance FFT processing is performed on the beat signal in the above-described manner, a plurality of vectors can be generated. The velocity FFT processing unit 12 can estimate a relative velocity to the predetermined object by determining a phase of a peak in a result of the velocity FFT processing performed on the plurality of vectors. That is, the electronic device 1 can measure (estimate) a relative velocity between the mobility device 100 and the predetermined object 200 illustrated in FIG. 1 by performing the velocity FFT processing. Since a technique for measuring (estimating) a relative velocity to a predetermined object by performing velocity FFT processing on a result of distance FFT processing is known, more detailed description is appropriately simplified or omitted. Results (for example, velocity information) of the velocity FFT processing performed by the velocity FFT processing unit 12 may be supplied to the angle-of-arrival estimating unit 13. The results of the velocity FFT processing performed by the velocity FFT processing unit 12 may also be supplied to the object detecting unit 14.

The angle-of-arrival estimating unit 13 estimates a direction from which the reflected wave R arrives from the predetermined object 200 on the basis of the results of the velocity FFT processing performed by the velocity FFT processing unit 12. The electronic device 1 can estimate the direction from which the reflected wave R arrives by receiving the reflected wave R from the plurality of reception antennas 31. For example, the plurality of reception antennas 31 are arranged at a predetermined interval. In this case, the transmission wave T transmitted from each of the transmission antennas 25 is reflected off the predetermined object 200 to become the reflected wave R. Each of the plurality of reception antennas 31 arranged at the predetermined interval receives the reflected wave R. The angle-of-arrival estimating unit 13 can estimate the direction from which the reflected wave R arrives at each of the plurality of reception antennas 31 on the basis of the phase of the reflected wave R received by the reception antenna 31 and a difference in path of the reflected wave R. That is, the electronic device 1 can measure (estimate) the angle of arrival 6 illustrated in FIG. 1 on the basis of the results of the velocity FFT processing.

Various techniques for estimating a direction from which the reflected wave R arrives on the basis of a result of velocity FFT processing have been proposed. For example, MUSIC (MUltiple SIgnal Classification), ESPRIT (Estimation of Signal Parameters via Rotational Invariance Technique), and the like are known as known arriving direction estimation algorithms. Thus, more detailed description of the known techniques is appropriately simplified or omitted. Information (angle information) of the angle of arrival e estimated by the angle-of-arrival estimating unit 13 may be supplied to the object detecting unit 14.

The object detecting unit 14 detects an object located in a range in which the transmission waves T are transmitted, on the basis of the information supplied from at least any of the distance FFT processing unit 11, the velocity FFT processing unit 12, and the angle-of-arrival estimating unit 13. The object detecting unit 14 may perform detection of an object by performing, for example, clustering processing on the basis of the supplied distance information, velocity information, and angle information. For example, DBSCAN (Density-based spatial clustering of applications with noise) or the like is known as an algorithm used in clustering of data. In the clustering processing, for example, average power of points constituting the detected object may be calculated. The distance information, the velocity information, the angle information, and power information of the object detected by the object detecting unit 14 may be supplied to the detection range determining unit 15. The distance information, the velocity information, the angle information, and the power information of the object detected by the object detecting unit 14 may be supplied to the ECU 50. In this case, when the mobility device 100 is an automobile, communication may be performed using a communication interface such as a CAN (Controller Area Network), for example.

The detection range determining unit 15 determines a range (hereinafter, also referred to as an "object detection range") in which an object that reflects the transmission wave T is detected on the basis of the transmission signal and the reception signal. The detection range determining unit 15 may determine a plurality of object detection ranges on the basis of an operation performed by a driver or the like of the mobility device 100 equipped with the electronic device 1, for example. For example, the detection range determining unit 15 may determine a plurality of object detection ranges suitable for parking assist when a parking assist button is operated by a driver or the like of the mobility device 100. The detection range determining unit 15 may determine a plurality of object detection ranges on the basis of an instruction from the ECU 50, for example. For example, when the ECU 50 determines that the mobility device 100 is to travel backward, the detection range determining unit 15 may determine, on the basis of an instruction from the ECU 50, a plurality of object detection ranges suitable when the mobility device 100 travels backward. The detection range determining unit 15 may determine a plurality of object detection ranges on the basis of a change in an operation state of a steering wheel, an accelerator pedal, a transmission lever, or the like of the mobility device 100, for example. The detection range determining unit 15 may determine a plurality of object detection ranges on the basis of a result of detection of an object performed by the object detecting unit 14.

The parameter setting unit 16 sets various parameters that define a transmission signal and a reception signal with which an object that reflects the transmission wave T as the reflected wave R is to be detected. That is, the parameter setting unit 16 sets various parameters for transmitting the transmission wave T from each of the transmission antennas 25 and various parameters for receiving the reflected wave R from each of the reception antennas 31.

In particular, in the first embodiment, the parameter setting unit 16 may set various parameters related to transmission of the transmission wave T and reception of the reflected wave R in order to detect an object in the object detection range described above. For example, the parameter setting unit 16 may define a range or the like in which the reflected wave R is desirably received in order to receive the reflected wave R and detect the object in the object detection range. For example, the parameter setting unit 16 may define a range to which a beam of the transmission wave T is desirably directed in order to transmit the transmission wave T from each of the plurality of transmission antennas 25 and detect an object in the object detection range. The parameter setting unit 16 may also set various parameters for transmitting the transmission wave T and receiving the reflected wave R.

The various parameters set by the parameter setting unit 16 may be supplied to the signal generating unit 21. Thus, the signal generating unit 21 can generate the transmission signal to be transmitted as the transmission wave T on the basis of the various parameters set by the parameter setting unit 16. The various parameters set by the parameter setting unit 16 may be supplied to the object detecting unit 14. Thus, the object detecting unit 14 can perform object detection processing in the object detection range determined on the basis of the various parameters set by the parameter setting unit 16.

The ECU 50 included in the electronic device 1 according to the first embodiment is capable of controlling the functional units of the mobility device 100 and also controlling operations of the entire mobility device 100. To provide control and processing capabilities for executing various functions, the ECU 50 may include at least one processor, for example, a CPU (Central Processing Unit). The ECU 50 may be collectively implemented by one processor, may be implemented by some processors, or may be implemented discrete individual processors. The processor may be implemented as one IC. The IC is also referred to as an integrated circuit. The processor may be implemented as a plurality of ICs and discrete circuits connected to be able to perform communication. The processor may be implemented on the basis of various other known technologies. In the first embodiment, the ECU 50 may be configured as, for example, a CPU and a program executed by the CPU. The ECU 50 may appropriately include a memory required for operations of the ECU 50. At least part of the functions of the control unit 10 may be functions of the ECU 50, or at least part of the functions of the ECU 50 may be functions of the control unit 10.

The electronic device 1 illustrated in FIG. 2 includes the two transmission antennas 25 and the four reception antennas 31. However, the electronic device 1 according to the first embodiment may include any number of transmission antennas 25 and any number of reception antennas 31. For example, by including the two transmission antennas 25 and the four reception antennas 31, the electronic device 1 can be regarded to include a virtual antenna array that is virtually constituted by eight antennas. As described above, the electronic device 1 may receive the reflected wave R of 16 subframes illustrated in FIG. 3 by using, for example, the eight virtual antennas.

A configuration in the case where the electronic device 1 according to the first embodiment is installed in the mobility device 100 such as an automobile is described next.

Figure 4:
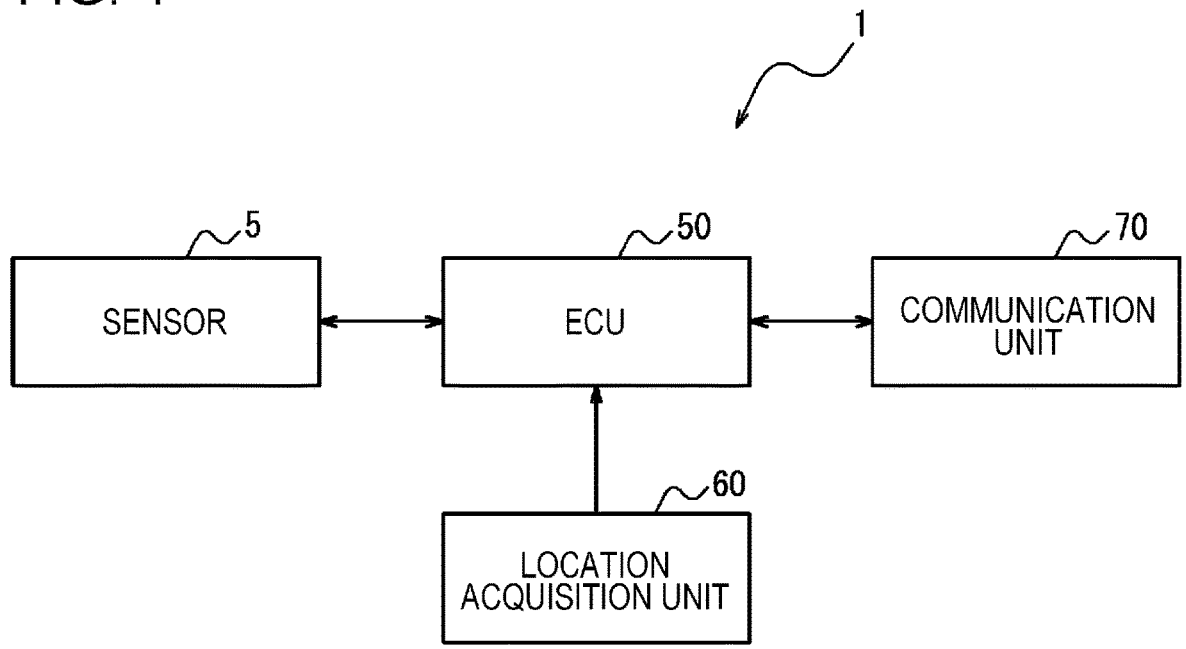
FIG. 4 is a functional block diagram schematically illustrating a configuration of the electronic device according to the first embodiment.

FIG. 4 is a functional block diagram schematically illustrating the configuration in the case where the electronic device 1 according to the first embodiment is installed in the mobility device 100 such as an automobile. The electronic device 1 illustrated in FIG. 2 includes the sensor 5 and the ECU 50. The sensor 5 and the ECU 50 illustrated in FIG. 4 may be the same as the sensor 5 and the ECU 50 illustrated in FIG. 2, respectively. In the case where the electronic device 1 is installed in the mobility device 100 such as an automobile, the electronic device 1 may further include a location acquisition unit 60 and a communication unit 70 as illustrated in FIG. 4 in addition to the sensor 5 and the ECU 50 illustrated in FIG. 2.

The sensor 5 and the ECU 50 illustrated in FIG. 4 are as described in FIG. 2.

The location acquisition unit 60 acquires information related to a location where the location acquisition unit 60 is located. The location where the location acquisition unit 60 is located may be, for example, a location of the sensor 5, the electronic device 1, or the mobility device 100 such as an automobile. The location acquisition unit 60 may acquire location information on the basis of a GNSS (Global Navigation Satellite System) technology or the like. The GNSS technology may include any of satellite-based positioning systems such as the GPS (Global Positioning System), the GLONASS, the Galileo, and the Quasi-Zenith Satellite System (QZSS), for example. The location acquisition unit 60 may be, for example, a location information income device such as a GPS module. The location acquisition unit 60 is not limited to the GPS module or the like and may be configured by any device capable of acquiring information related to the location.

The location information acquired by the location acquisition unit 60 may include at least any information from among latitude information, longitude information, and altitude information, for example. The location information acquired by the location acquisition unit 60 is supplied to the ECU 50. The ECU 50 can grasp the current location of the electronic device 1 (or the sensor 5 or the mobility device 100) on the basis of the location information supplied from the location acquisition unit 60.

The communication unit 70 is an interface for wired or wireless communication. The communication scheme carried out by the communication unit 70 according to the first embodiment may be based on wireless communication standards. For example, the wireless communication standards include mobile phone communication standards such as 2G, 3G, 4G, and 5G. For example, the mobile phone communication standards include LTE (Long Term Evolution), W-CDMA (Wideband Code Division Multiple Access), CDMA2000, PDC (Personal Digital Cellular), GSM (registered trademark) (Global System for Mobile communications), PHS (Personal Handy-phone System), and so on. For example, the wireless communication standards include WiMAX (Worldwide Interoperability for Microwave Access), IEEE 802.11, Bluetooth (registered trademark), IrDA (Infrared Data Association), NFC (Near Field Communication), and so on. The communication unit 70 can support one or a plurality of communication standards among the aforementioned communication standards.

The communication unit 70 transmits and receives various kinds of data by performing wired communication and/or wireless communication with an information processing apparatus such as an external server, for example. The communication performed by the communication unit 70 may be at least one of transmission and reception of various kinds of data. The communication unit 70 can transmit, for example, the location of the electronic device 1 acquired by the location acquisition unit 60 to an information processing apparatus such as an external server, for example. The communication unit 70 can also transmit, for example, at least any of various kinds of information detected by the sensor 5 to an information processing apparatus such as an external server, for example. The communication unit 70 can receive, for example, various kinds of information by an information processing apparatus such as an external server.

An example of a configuration of a system including the electronic device 1 according to the first embodiment is described next.

Figure 5:
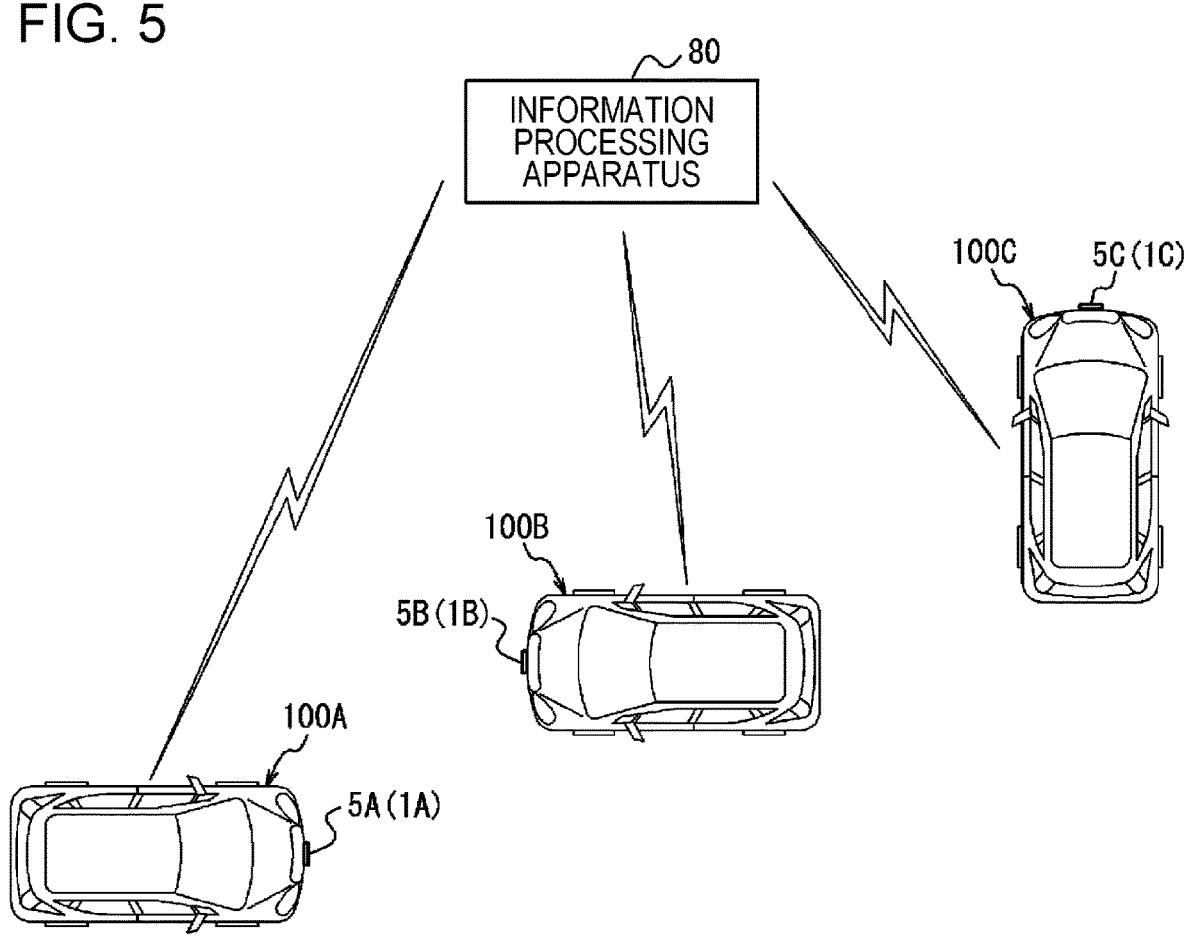
FIG. 5 is a diagram schematically illustrating a configuration of a system according to the first embodiment.

FIG. 5 is a diagram schematically illustrating an example of the configuration of the system including the electronic device 1 according to the first embodiment. As illustrated in FIG. 5, the system according to the first embodiment includes the electronic devices 1 and an information processing apparatus 80.

As illustrated in FIG. 5, an electronic device 1A including a sensor 5A is installed on a mobility device 100A. An electronic device 1B including a sensor 5B is installed on a mobility device 100B. An electronic device 1C including a sensor 5C is installed on a mobility device 100C. When the mobility devices 100A, 100B, and 100C are not distinguished from one another, the mobility devices 100A, 100B, and 100C are simply referred to as "mobility devices 100" below. When the sensors 5A, 5B, and 5C are not distinguished from one another, the sensors 5A, 5B, and 5C are simply referred to as "sensors 5". When the electronic devices 1A, 1B, and 1C are not distinguished from one another, the electronic devices 1A, 1B, and 1C are simply referred to as "electronic devices 1". The electronic devices 1 may be the same as that described in FIGS. 2 and 4.

The system illustrated in FIG. 5 presents an example in which the system includes three mobility devices 100 each equipped with the electronic device 1. However, the system according to the first embodiment may include at least one mobility device 100 equipped with the electronic device 1. As illustrated in FIG. 5, the electronic device 1 installed in each of the mobility devices 100 can wirelessly communicate with the information processing apparatus 80. Through such communication, the electronic device 1 and the information processing apparatus 80 can exchange various kinds of data.

As described later, the information processing apparatus 80 may be any information processing apparatus (for example, a computer) such as a server of various kinds or a cloud server. The electronic device 1 and the information processing apparatus 80 may be connected to each other via a network, for example. The system illustrated in FIG. 5 presents an example in which the system includes only one information processing apparatus 80. However, the system according to the first embodiment may include two or more information processing apparatuses 80. In this case, for example, the plurality of information processing apparatuses 80 may be configured to be able to communicate with each other in a wired and/or wireless manner.

Figure 6:
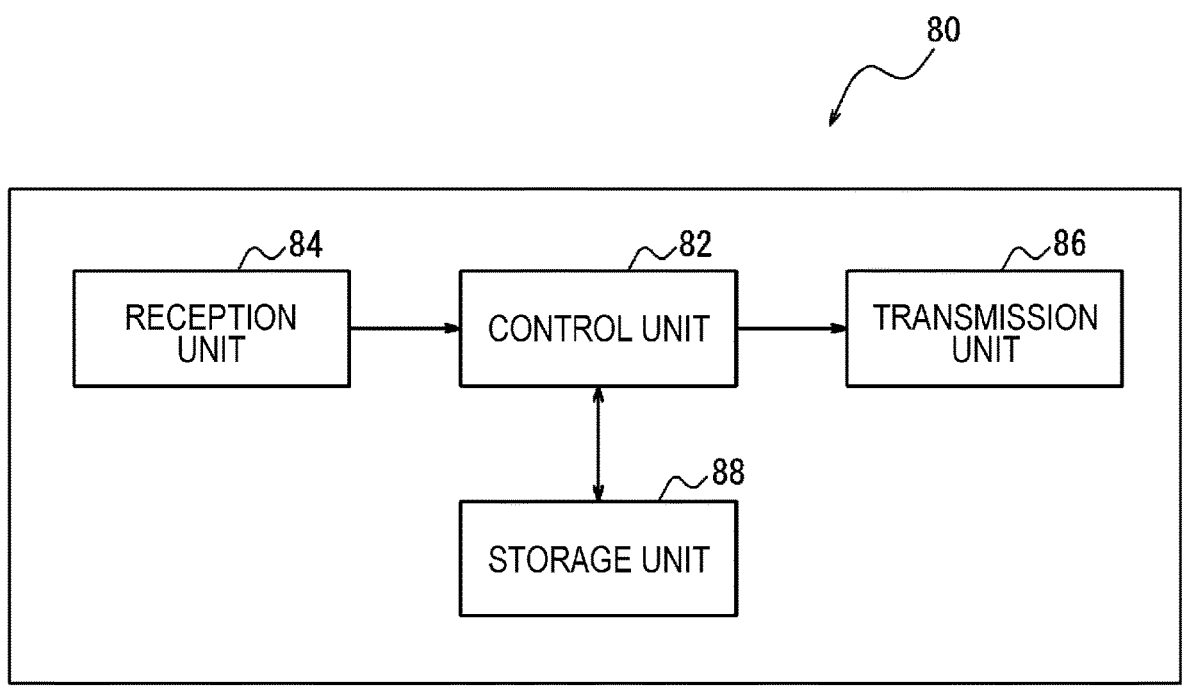
FIG. 6 is a functional block diagram schematically illustrating a configuration of an information processing apparatus according to the first embodiment.

FIG. 6 is a functional block diagram schematically illustrating a configuration of the information processing apparatus according to the first embodiment. FIG. 6 illustrates a configuration of an example of the information processing apparatus 80 illustrated in FIG. 5 in more detail.

As illustrated in FIG. 6, the information processing apparatus 80 includes a control unit 82, a reception unit 84, a transmission unit 86, and a storage unit 88.

The control unit 82 includes at least one processor that controls and/or manages the functional blocks of the information processing apparatus 80 and the entire information processing apparatus 80. The control unit 82 includes at least one processor such as a CPU that executes a program defining a control procedure so as to implement functions thereof. Such a program is stored in, for example, the storage unit 88, an external storage medium connected to the information processing apparatus 80, or the like.

The reception unit 84 may be configured to be able to receive various kinds of information from another apparatus in a wired and/or wireless manner. For example, the reception unit 84 may receive information based on a detection result obtained by the sensor 5 of the electronic device 1 from the communication unit 70 of the electronic device 1 illustrated in FIG. 4. The reception unit 84 may also receive various kinds of information from another information processing apparatus or the like other than the information processing apparatus 80.

The transmission unit 86 may be configured to be able to transmit various kinds of information to another apparatus in a wired and/or wireless manner. For example, the transmission unit 86 may transmit information based on a processing result obtained by the control unit 82 and/or information read from the storage unit 88, to the communication unit 70 of the electronic device 1 illustrated in FIG. 4. The transmission unit 86 may also transmit various kinds of information to another information processing apparatus or the like other than the information processing apparatus 80.

Each of the reception unit 84 and/or the transmission unit 86 is an interface for wired or wireless communication. The communication scheme carried out by the reception unit 84 and/or the transmission unit 86 according to the first embodiment may be based on wireless communication standards. For example, the wireless communication standards include mobile phone communication standards such as 2G, 3G, 4G, and 5G. For example, the mobile phone communication standards include LTE (Long Term Evolution), W-CDMA (Wideband Code Division Multiple Access), CDMA2000, PDC (Personal Digital Cellular), GSM (registered trademark) (Global System for Mobile communications), PHS (Personal Handy-phone System), and so on. For example, the wireless communication standards include WiMAX (Worldwide Interoperability for Microwave Access), IEEE 802.11, Bluetooth (registered trademark), IrDA (Infrared Data Association), NFC (Near Field Communication), and so on. The reception unit 84 and/or the transmission unit 86 can support one or a plurality of communication standards among the aforementioned communication standards.

The storage unit 88 may store a program executed by the control unit 82, a result of processing performed by the control unit 82, etc. The storage unit 88 may function as a work memory of the control unit 82. The storage unit 88 may be constituted by a semiconductor memory or a magnetic disk, for example. However, the storage unit 88 is not limited to these, and can be any storage device. The storage unit 88 may be, for example, a storage medium such as a memory card inserted to the electronic device 1 according to the present embodiment. The storage unit 88 may be an internal memory of the CPU used as the control unit 82 as described above.

Operations of the electronic device 1 and the information processing apparatus 80 in the system according to the first embodiment are described next.

As illustrated in FIG. 5, the electronic device 1 according to the first embodiment transmits, to the information processing apparatus 80, information based on a detection result obtained by the sensor 5 installed on a respective one of the mobility devices 100 that are traveling at respective locations. That is, in the system according to the first embodiment, pieces of information based on results detected by the respective sensors 5 of the respective electronic devices 1 at various locations are gathered at the information processing apparatus 80. The location of each of the mobility devices 100 in FIG. 5 is schematically illustrated. The plurality of mobility devices 100 each may be located at any location, may be located close to each other, or may be located far from each other. On the basis of a result obtained by performing statistical processing on the gathered information, the information processing apparatus 80 generates a parameter to be used in determining whether an object is detected by the electronic device 1. The information processing apparatus 80 then transmits the parameter thus generated to the electronic device 1 mounted in each of the mobility devices 100. Thus, the electronic device 1 can determine whether an object is detected on the basis of the generated parameter. Such an operation is described in more detail below. In FIG. 5, the number of mobility devices 1 and the number of sensors 5 are three. However, the number of mobility devices 1 and the number of sensors 5 may be any number in the present disclosure.

Figure 7:
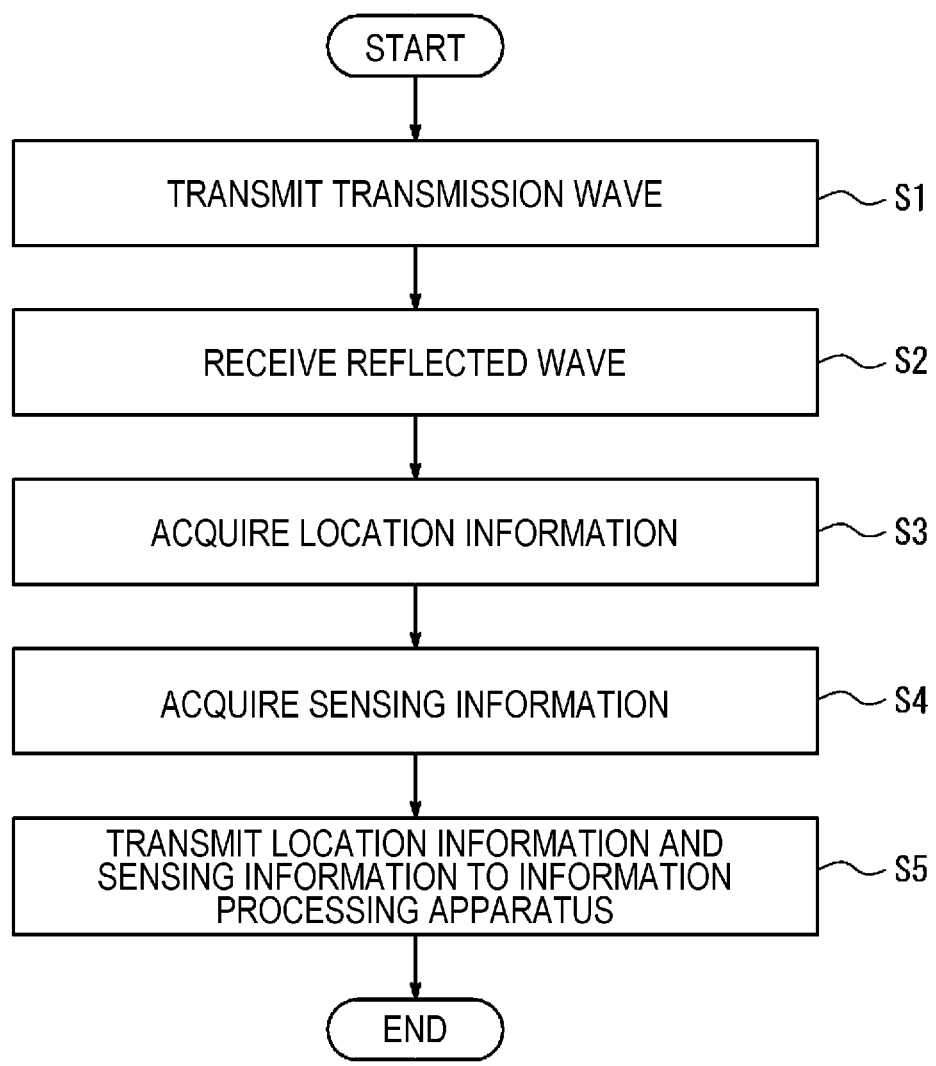
FIG. 7 is a flowchart for describing an operation of the electronic device according to the first embodiment.

FIG. 7 is a flowchart for describing an operation performed by the electronic device 1 in the system according to the first embodiment. FIG. 7 describes an operation performed by the electronic device 1 until the electronic device 1 transmits sensing information based on a transmission signal and a reception signal at a location of the electronic device 1 to the information processing apparatus 80. It is assumed that the electronic device 1 is mounted in the mobility device 100 and the mobility device 100 is traveling on, for example, a roadway when the operation illustrated in FIG. 7 starts. FIG. 7 may present an operation performed by the electronic device 1 mounted in any of the plurality of mobility devices 100 illustrated in FIG. 5.

In response to the start of the operation illustrated FIG. 7, the control unit 10 of the electronic device 1 transmits a transmission wave from the transmission antennas 25 (step S1). The transmission wave transmitted by the electronic device 1 in step S1 may be, for example, chirp signals illustrated in FIG. 3.

After the transmission wave is transmitted in step S1, the control unit 10 receives, from the reception antennas 31, a reflected wave that is the transmission wave reflected off by an object, for example (step S2). As described above, the electronic device 1 can generate a beat signal on the basis of the transmission signal and the reception signal. The control unit 10 can also determine that an object (reflecting object) that reflects the transmission wave is located, by performing the distance FFT processing and the like on the beat signal. Thus, the electronic device 1 can detect the object that reflects the transmission wave on the basis of the transmission signal transmitted as the transmission wave and the reception signal received as the reflected wave that is the reflected transmission wave.

The control unit 10 may determine the number of detected objects on the basis of the transmission signal and the reception signal. The "number of detected objects" determined in this case indicates the number of objects detected at the location of the electronic device 1 at that time point. The control unit 10 may determine a noise level of a signal based on the transmission signal and the reception signal, an object detection SNR (a signal-to-noise ratio or a signal quality), or the like, that is, a noise level during detection of an object. "The noise level, the object detection SNR, or the like" determined in this case indicates a noise level, an object detection SNR, or the like at the location of the electronic device 1 at that time point. Information such as the number of detected objects and/or the noise level, the object detection SNR, or the like thus determined may be temporarily stored in the storage unit 40, for example.

After receiving the reflected wave in step S2, the electronic device 1 acquires information on the location of the device (the electronic device 1, the sensor 5, or the mobility device 100) from the location acquisition unit 60 (step S3). In step S3, the location acquisition unit 60 may acquire the location through a satellite-based positioning system such as the GPS, for example.

After acquiring the location information in step S3, the electronic device 1 acquires sensing information based on the transmission signal and the reception signal at the location of the electronic device 1 (step S4). The sensing information may be information related to the noise level of a signal based on the transmission signal and the reception signal, the object detection SNR (a signal-to-noise ratio or a signal quality), or the like as described in step S2 above. The sensing information may be information related to the number of objects detected on the basis of the transmission signal and the reception signal as described in step S2 above. The sensing information may include at least any of these pieces of information. In step S4, the electronic device 1 may acquire the sensing information stored in the storage unit 40, for example. The sensing information may be information on at least one of the transmission signal and the reception signal. For example, the electronic device 1 may use, as the sensing information, intensity of the reception signal and/or a noise distribution of the reception signal with respective to the frequency.

After acquiring the sensing information in step S4, the electronic device 1 transmits the sensing information to the information processing apparatus 80 along with the location information acquired in step S3 (step S5). In step S5, the electronic device 1 may transmit the information from the communication unit 70 to the reception unit 84 of the information processing apparatus 80.

As described above, in the first embodiment, the electronic device 1 transmits the sensing information based on the transmission signal and the reception signal at the location of the electronic device 1 to the information processing apparatus 80 along with the location information of the electronic device 1. Control for performing transmission in this manner may be performed by the control unit 10 and/or the ECU 50, for example. The sensing information may include information related to the noise level during detection of an object at the location of the electronic device 1. The sensing information may include information related to the number of objects detected from the location of the electronic device 1.

As described above, FIG. 7 may present an operation performed by the electronic device 1 mounted in any of the plurality of mobility devices 100 illustrated in FIG. 5. That is, each of the electronic devices 1 mounted in the respective mobility devices 100 illustrated in FIG. 5 may perform the operation illustrated in FIG. 7. In this manner, the information processing apparatus 80 in the system according to the first embodiment can collect the sensing information obtained by the communicating electronic device 1 at each location at each time point. In the system according to the first embodiment, the information processing apparatus 80 can collect the sensing information from any number of electronic devices 1. Thus, the information processing apparatus 80 can collect the sensing information for various locations and for respective time points.

Figure 8:
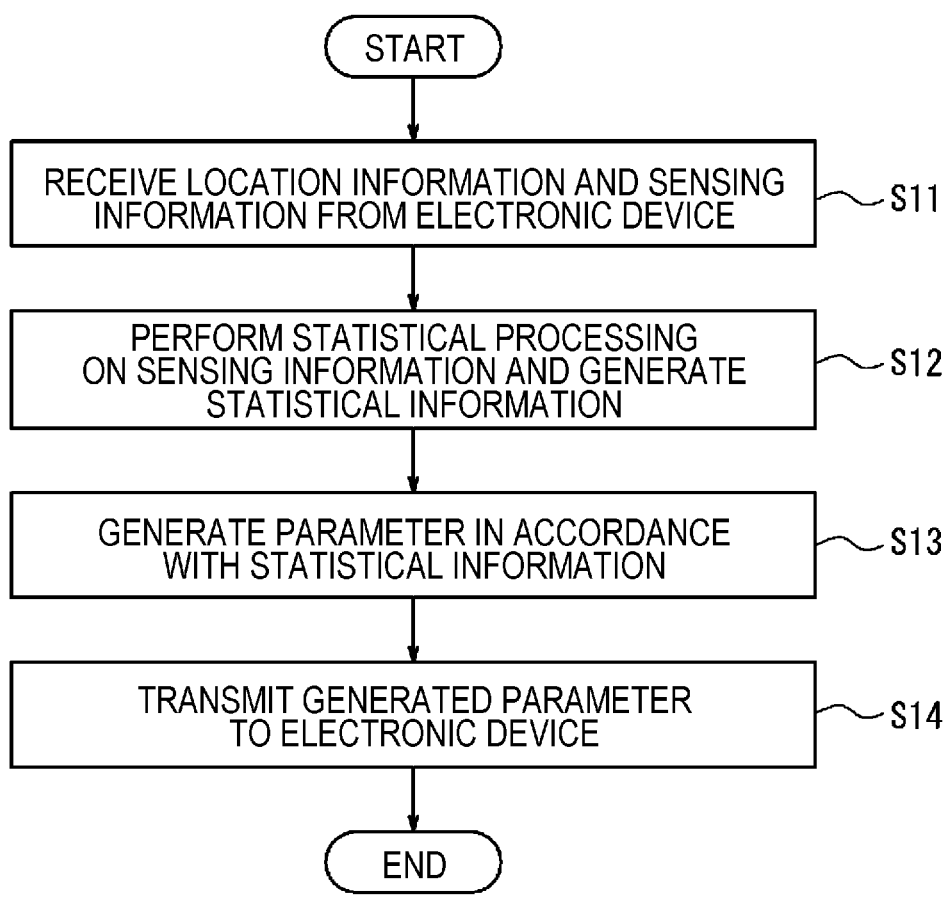
FIG. 8 is a flowchart for describing an operation of the information processing apparatus according to the first embodiment.

FIG. 8 is a flowchart for describing an operation performed by the information processing apparatus 80 in the system according to the first embodiment. FIG. 8 describes an operation performed by the information processing apparatus 80 until the information processing apparatus 80 transmits, to the electronic device 1, a result obtained by processing information received from the electronic device 1. It is assumed that the information processing apparatus 80 is in a state of being able to communicate with at least one electronic device 1 when the operation illustrated in FIG. 8 starts. FIG. 8 may present an operation performed by the information processing apparatus 80 illustrated in FIG. 5.

In response to the start of the operation illustrated in FIG. 8, the reception unit 84 of the information processing apparatus 80 receives the sensing information along with the location information of at least one electronic device 1 from the electronic device 1 (step S11). The sensing information received by the reception unit 84 in step S11 may be sensing information based on the transmission signal and the reception signal at the location of the at least one electronic device 1. In step S11, the information processing apparatus 80 may receive the location information and the sensing information from any number of electronic devices 1. For example, the information processing apparatus 80 may receive, from many electronic devices 1 mounted in the respective mobility devices 100 that are traveling or stationary at various locations, the location information and the sensing information of the respective electronic devices 1.

The location information and the sensing information of the electronic device 1 received by (the reception unit 84 of) the information processing apparatus 80 in step S11 may be the information transmitted from (the communication unit 70 of) the electronic device 1 in step S5 in FIG. 7. That is, the sensing information received by the reception unit 84 in step S11 may be information related to a noise level during detection of an object at the location of the electronic device 1. The sensing information received by the reception unit 84 in step S11 may be information related to the number of objects detected from the location of the electronic device 1.

The location information and the sensing information of the electronic device 1 received in step S11 may be stored in the storage unit 88 or the like. In this case, the control unit 82 may store the sensing information obtained at the location of the electronic device 1 in the storage unit 88 in association with the location information of the electronic device 1. In this manner, the information processing apparatus 80 can accumulate, for a predetermined period, the location information and the sensing information received from many electronic devices 1. Thus, the information processing apparatus 80 can construct a database of the sensing information for each location and for each time point.

For example, the control unit 82 may virtually divide a map of a certain region into a mesh of several meters in all directions, for example, and may accumulate, for each divided area, the sensing information associated with the divided area in the storage unit 88. The virtually divided areas may have any size, for example, one meter or several kilometers in all directions. The shape of the virtually divided areas is not limited to the mesh shape and may be any shape such as a triangular shape or a honeycomb shape. The control unit 82 may accumulate, for each predetermined period, the sensing information for the location associated with the area in the storage unit 88. For example, the control unit 82 may accumulate, in the storage unit 88, the sensing information for a location X1 (or area X1) for each predetermined period of 1 minute, 3 minutes, 5 minutes, 10 minutes, or 30 minutes. For example, the control unit 82 may accumulate, in the storage unit 88, the sensing information for the location X1 (or area X1) for each period of one hour such as from 6 AM to 7 AM, from 7 AM to 8 AM, and from 8 AM to 9 AM. For example, the control unit 82 may accumulate, in the storage unit 88, the sensing information for a location X2 (or area X2), a location X3 (or area X3), or the like for each period of one hour as in the above case.

The control unit 82 may accumulate, in the storage unit 88, the sensing information for each location (or area) for each time slot of a predetermined peak time and/or each time slot of a predetermined idle time, instead of for each period of one hour. The control unit 82 may accumulate, in the storage unit 88, the sensing information for each location (or area), for example, for each day of the week, for each date of months, for each month, or the like. The control unit 82 may accumulate, in the storage unit 88, the sensing information for each location (or area), for example, for each season such as spring, summer, fall, or winter. The control unit 82 may accumulate, in the storage unit 88, the sensing information for each location (or area) for each weather (that is, for fine weather or for rainy weather). The control unit 82 may accumulate, in the storage unit 88, the sensing information for each condition or state.

After the location information and the sensing information of the electronic device 1 are received in step S11, the control unit 82 of the information processing apparatus 80 performs statistical processing on the sensing information (step S12). In step S12, the statistical processing performed on the sensing information by the control unit 82 may be, for example, processing of calculating an average or the like. For example, in step S12, the control unit 82 may calculate an average of the sensing information for each location (or area) described above for each time slot described above. A result obtained by performing the statistical processing on the sensing information by the control unit 82 in step S12 is hereinafter referred to as "statistical information". For example, in the case where the sensing information is information related to a noise level during detection of an object at the location of the electronic device 1, the statistical information is information indicating an average noise level at that location in that time slot. For example, in the case where the sensing information is information related to the number of objects detected from the location of the electronic device 1, the statistical information is information indicating an average number of objects detected at that location in that time slot. Other than the processing of calculating an average, processing of calculating a median, a mode, or the like may be used as the statistical processing performed on the sensing information by the control unit 82.

After generating the statistical information in step S12, the control unit 82 generates, in accordance with the statistical information, a parameter to be used in determining whether an object is detected by the electronic device 1 (step S13). For example, in step S13, the control unit 82 may generate, in accordance with the statistical information, a parameter for the location X1 (or area X1) for each predetermined period of 1 minute, 3 minutes, 5 minutes, 10 minutes, or 30 minutes. In step S13, the control unit 82 may generate, in accordance with the statistical information, a parameter for the location X1 (or area X1) for each predetermined period of one hour, several hours, one day, or several days.

Examples of the parameter to be used by the electronic device 1 in determining whether an object is detected is now described.

(First Parameter)

As described in FIG. 2, in the electronic device 1, the transmission signal is transmitted from the transmission antennas 25. In the electronic device 1, at least part of a reflected wave that is the transmission signal reflected off the object is received as a reception signal from the reception antennas 31. This reception signal is subjected to amplification processing in the LNA 32 or the like and is converted into a digital signal after passing through the AD conversion unit 35. This digital signal is subjected to distance FFT processing in the distance FFT processing unit 11. In this manner, the object detecting unit 14 (the control unit 10) can estimate a distance to the object.

Figure 9:
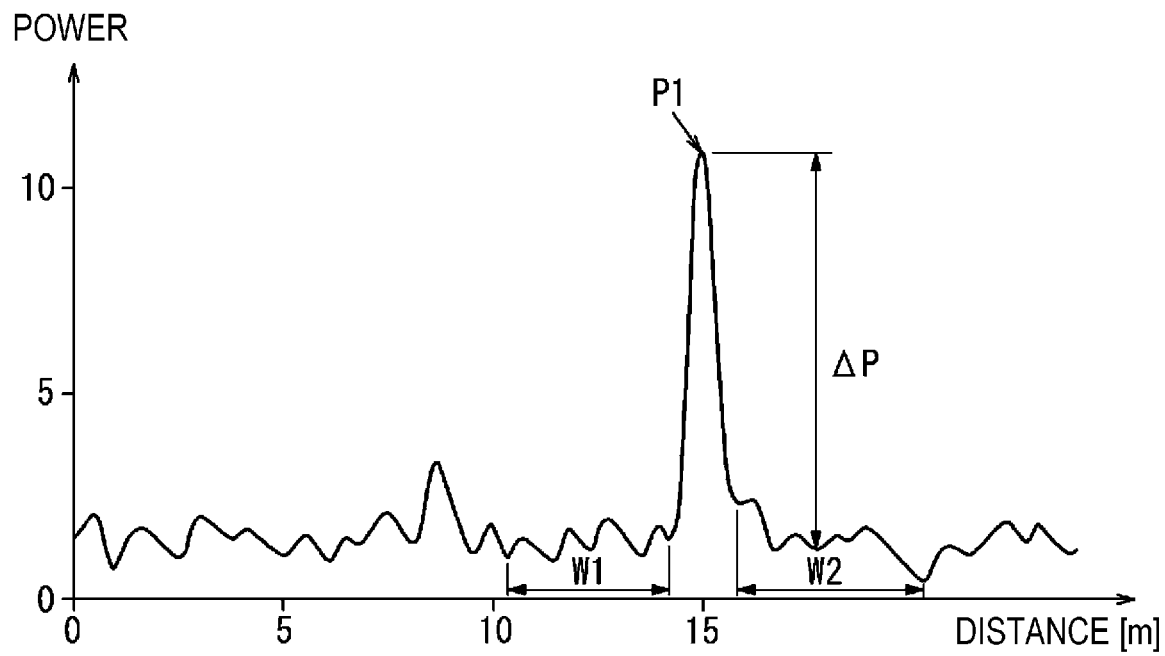
FIG. 9 is a diagram for describing detection of an object performed by the electronic device according to the first embodiment.

The digital signal having undergone the distance FFT processing by the distance FFT processing unit 11 is illustrated in FIG. 9, for example. The object detecting unit 14 of the electronic device 1 can determine whether there is an object by using the signal illustrated in FIG. 9, for example. FIG. 9 is a diagram illustrating an example of a result obtained by performing distance FFT processing on a beat signal. In FIG. 9, the horizontal axis represents a distance and the vertical axis represents power of the signal. For example, it can be determined that an object that has reflected the transmission wave may be located at a distance corresponding to a point P1 at which the power peaks in FIG. 9.

When such determination is made, as indicated by ranges W1 and W2 in FIG. 9 for example, range for estimating noise power (hereinafter, referred to as "noise power estimation ranges") are provided at respective sides of a point where it is determined whether an object is detected. Power in the noise power estimation ranges such as these ranges W1 and W2 is averaged, and the resultant average is denoted as noise power Pn. Power Pd at the point where it is determined whether an object is detected (for example, the point P1 where the power peaks) is compared with the noise power Pn (a difference therebetween is denoted as ΔP in FIG. 9). If the difference ΔP obtained by comparison of these is greater than a predetermined parameter value x [dB], the electronic device 1 can determine that an object is detected at that point (at a location at a distance corresponding to that point). On the other hand, if the difference ΔP is not greater than the parameter value x [dB], the electronic device 1 can determine that no object is detected at that point (at the location at the distance corresponding to that point). Thus, in the case of this example, the parameter to be used in determining whether an object is detected by the electronic device 1 can be the parameter value x whose magnitude is compared with the difference ΔP.

However, depending a surrounding environment in which the electronic device 1 operates, a case is expected where whether an object is detected cannot be appropriately determined by using the parameter described above. For example, in an environment in which another radar that uses the same frequency band as the electronic device 1 is located around the electronic device 1, the case is expected where whether an object is detected cannot be appropriately determined by using the parameter described above. For example, in an environment where the surrounding environment is a hard-to-see-ahead environment (such as a narrow road or a lane with many buildings therearound), the case is expected where whether an object is detected cannot be appropriately determined by using the parameter described above.

Figure 10:
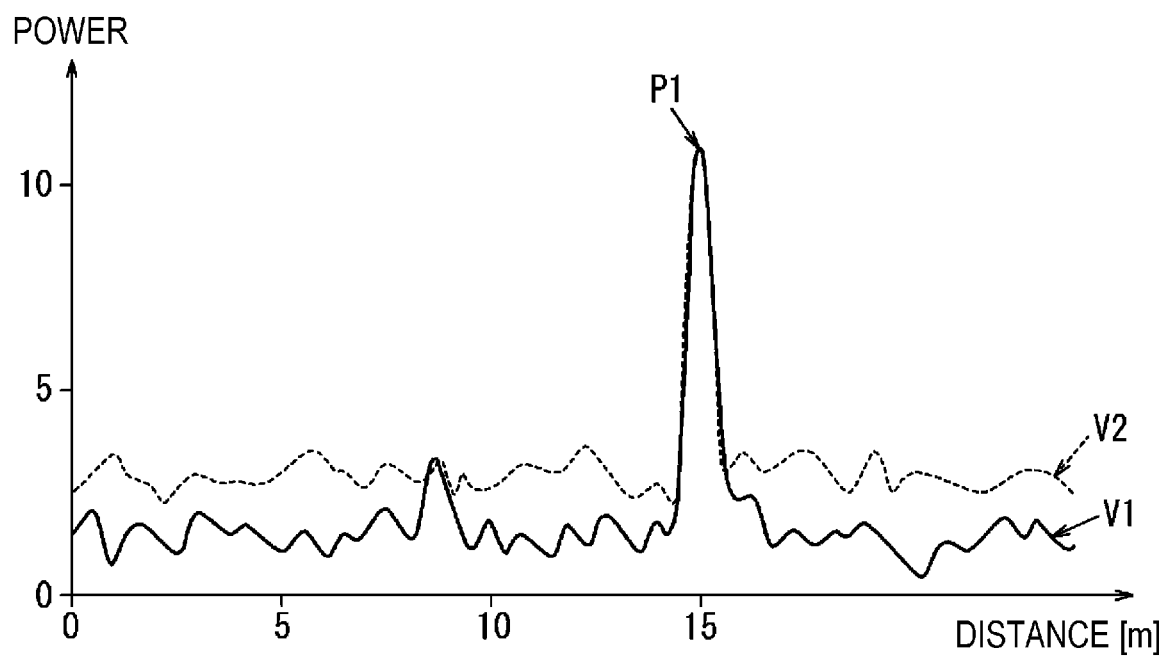
FIG. 10 is a diagram for describing detection of an object performed by the electronic device according to the first embodiment.

The digital signal obtained by the distance FFT processing as described above is supposed to be represented as a solid-line graph V1 of FIG. 10 but is represented as a dash-line graph V2 of FIG. 10 in such environments because of increased noise. FIG. 10 is a diagram illustrating an example of a result obtained by performing distance FFT processing on a beat signal as in FIG. 9. In FIG. 10, the horizontal axis represents a distance and the vertical axis represents power of the signal. In FIG. 10, the solid-line graph V1 indicates an example of a result obtained by performing distance FFT processing on a beat signal in the case where no other radars that use the same frequency type as the electronic device 1 are located around the electronic device 1 or in the case where the surrounding environment is clear. On the other hand, in FIG. 10, the dash-line graph V2 indicates an example of a result obtained by performing distance FFT processing on a beat signal in the case where another radar that uses the same frequency type as the electronic device 1 is located around the electronic device 1 and/or in the case where the surrounding environment is hard to see ahead.

In an environment with lots of noise as indicated by V2 illustrated in FIG. 10, if the parameter value x whose magnitude is compared with the difference ΔP described in FIG. 9 is used as it is, it may be determined that no object is detected regardless of the fact that the graph has a large peak. Thus, in this case, for example, the control unit 82 of the information processing apparatus 80 decreases the parameter value x so that the electronic device 1 can appropriately detect an object. In step S12 in FIG. 8, statistical processing (for example, averaging) is performed on the sensing information, so that statistical information is generated. In the first embodiment, the control unit 82 of the information processing apparatus 80 may decrease the parameter value x as the noise level of the sensing information (statistical information) having been subjected to the statistical processing increases, for example. A relationship between the magnitude of the noise level of the sensing information having been subjected to the statistical processing and a degree by which the parameter value x is decreased may be predetermined based on a test, for example, and the predetermined relationship may be stored in the storage unit 88. The control unit 82 need not decrease the parameter value x when the noise level of the sensing information (statistical information) having been subjected to the statistical processing is not high.

The control unit 82 may conversely increase the parameter value x when the noise level of the sensing information (statistical information) having been subjected to the statistical processing is low.

In step S13 in FIG. 8, the parameter to be used by the electronic device 1 in determining whether an object is detected is generated in accordance with the statistical information as described above. The control unit 82 may generate the parameters to be used in determining whether an object is detected by the electronic device 1, for various locations (or areas) of the electronic device 1 for each of the various time slots mentioned above.

After the parameter is generated in step S13, the transmission unit 86 of the information processing apparatus 80 transmits the generated parameter to the electronic device 1 (step S14). In step S14, the transmission unit 86 of the information processing apparatus 80 may transmit the generated parameter to the communication unit 70 of the electronic device 1. In step S14, in response to a request for the parameter from the electronic device 1 installed in the mobility device 100 that is traveling or stationary at a certain location or in a certain area, the information processing apparatus 80 may transmit the generated parameter corresponding to the location or the region. In step S14, in response to a request for the parameter from the electronic device 1 installed in the mobility device 100 that is traveling or stationary at a certain location or in a certain area, the information processing apparatus 80 may transmit the generated parameters corresponding to the various locations or the various regions.

In step S14 described above, the information processing apparatus 80 transmits the generated parameter such as the generated parameter value x, for example, to the electronic device 1. The information processing apparatus 80 may transmit a correction value for use in generation of the parameter value x to the electronic device 1 instead of transmitting the generated parameter directly to the electronic device 1. After the parameter is transmitted to the electronic device 1 in step S14, the control unit 82 may end the operation illustrated in FIG. 8.

As described above, in the first embodiment, the information processing apparatus 80 communicates with the electronic device 1. The reception unit 84 of the information processing apparatus 80 receives, from the electronic device 1, the sensing information based on the transmission signal and the reception signal at the location of the electronic device 1 along with the location information of the electronic device 1. The control unit 82 of the information processing apparatus 80 then performs the statistical processing on the sensing information obtained at the location of the electronic device 1 to generate the statistical information, and generates, in accordance with the statistical information, a parameter to be used in determining whether an object is detected by the electronic device 1. The transmission unit 86 of the information processing apparatus 80 transmits the parameter generated by the control unit 82 to the electronic device 1.

Another example of the parameter to be used in determining whether an object is detected by the electronic device 1 is described next.

(Second Parameter)

As described above, when the electronic device 1 determines whether an object is detected, the noise power estimation ranges such as the ranges W1 and W2 in FIG. 9, for example, are provided. As described above, the noise power estimation ranges such as the ranges W1 and W2 are provided on the respective sides of the point where it is determined whether an object is detected. By appropriately providing the noise power estimation ranges such as these ranges W1 and W2, the electronic device 1 can detect a power peak indicated by the point P1 in FIG. 9, for example.

However, if the noise power estimation ranges such as these ranges W1 and W2 are not appropriately provided, the electronic device 1 expectedly fails to appropriately detect a power peak indicated by the point P1 in FIG. 9, for example. In particular, in an environment where the surrounding environment is a hard-to-see-ahead environment (such as a narrow road or a lane with many buildings therearound), the electronic device 1 expectedly fails to appropriately determine whether an object is detected unless the noise power estimation ranges such as the ranges W1 and W2 are appropriately provided.

Figure 11:
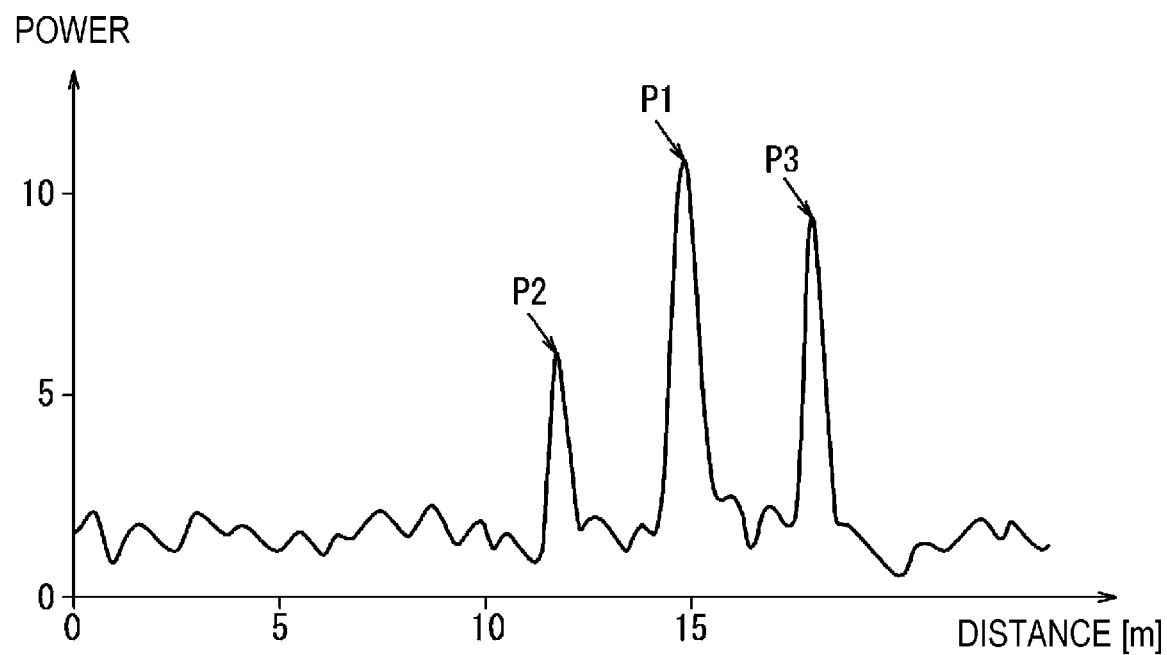
FIG. 11 is a diagram for describing detection of an object performed by the electronic device according to the first embodiment.

For example, it is assumed that as a result of the distance FFT processing unit 11 of the electronic device 1 performing distance FFT processing on a beat signal, the result contains a plurality of peaks as illustrated in FIG. 11. FIG. 11 is a diagram illustrating an example of a result obtained by performing distance FFT processing on a beat signal as in FIGS. 9 and 10. In FIG. 11, the horizontal axis represents a distance and the vertical axis represents power of the signal. In FIG. 11, a power peak indicated by a point P2 and a power peak indicated by a point P3 are located near a power peak indicated by a point P1 on the left and right sides, respectively. If the noise power estimation ranges W1 and W2 illustrated in FIG. 9, for example, are provided when other power peaks are located near the power peak indicated by the point P1, the electronic device 1 may fail to determine that an object is detected at the point corresponding to the point P1. Thus, in this case, for example, the width(s) of the noise power estimation range(s) W1 and/or W2 is decreased so that the electronic device 1 can appropriately detect the object. In the case of this example, the parameter to be used in determining whether an object is detected by the electronic device 1 can be a parameter value indicating the range(s) (width(s)) of the noise power estimation range(s) W1 and/or W2.

The number of power peaks (P1 to P3) illustrated in FIG. 11 tends to increase as the number of objects detected by the electronic device 1 increases. Thus, for example, the range(s) (the width(s)) of the noise power estimation range(s) W1 and/or W2 may be decreased as the number of objects detected by the electronic device 1 increases. As described above, in step S12 in FIG. 8, statistical processing (for example, averaging) is performed on the sensing information, so that statistical information is generated. In the first embodiment, the control unit 82 of the information processing apparatus 80 may decrease the parameter value as the number of objects for which the sensing information (statistical information) having been subjected to the statistical processing increases, for example. A relationship between the number of objects for which the sensing information having been subjected to statistical processing is detected and a degree by which the parameter value is decreased may be predetermined based on a test, for example, and the predetermined relationship may be stored in the storage unit 88. The control unit 82 need not decrease the parameter value when the number of objects for which the sensing information (statistical information) having been subjected to the statistical processing is not large. The control unit 82 may conversely increase the parameter value when the number of objects for which the sensing information (statistical information) having been subjected to the statistical processing is small.

As in the example described above, in step S14, the information processing apparatus 80 may transmit a correction value for use in generation of the parameter value to the electronic device 1 instead of transmitting the generated parameter directly to the electronic device 1.

Figure 12:
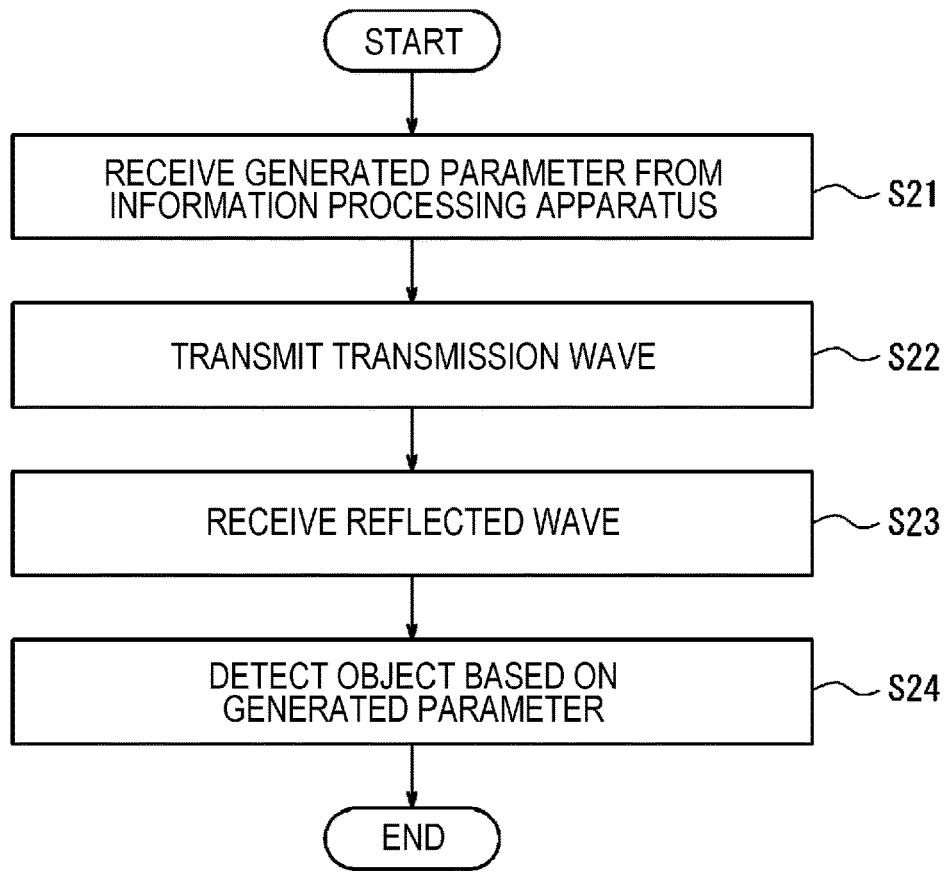
FIG. 12 is a flowchart for describing an operation of the electronic device according to the first embodiment.

FIG. 12 is a flowchart for describing an operation performed by the electronic device 1 in the system according to the first embodiment. FIG. 12 may be a flowchart for describing an operation performed by the electronic device 1 after the information processing apparatus 80 performs the operation illustrated in FIG. 8 in the system according to the first embodiment. FIG. 12 describes an operation, of the electronic device 1, for receiving the generated parameter from the information processing apparatus 80 and for detecting an object on the basis of the generated parameter. FIG. 12 may present an operation performed by the electronic device 1 mounted in the mobility device 100 illustrated in FIG. 5. It is assumed that at least one electronic device 1 is in a state of being able to communicate with the information processing apparatus 80 when the operation illustrated in FIG. 12 starts.

In response to the start of the operation illustrated in FIG. 12, the communication unit 70 of the electronic device 1 receives the generated parameter from the transmission unit 86 of the information processing apparatus 80 (step S21). The generated parameter received by the communication unit 70 in step S21 may be the parameter transmitted from the information processing apparatus 80 in step S14 in FIG. 8. In step S21, the electronic device 1 may receive the parameter generated for the location (or area) of the electronic device 1. In step S21, the electronic device 1 may receive the parameter generated for the time slot including the current time.

After the generated parameter is received in step S21, the control unit 10 of the electronic device 1 transmits the transmission wave from the transmission antennas 25 (step S22). The operation in step S22 may be performed in the same and/or similar manner as the operation in step S1 illustrated in FIG. 7.

After the transmission wave is transmitted in step S22, the control unit 10 receives, from the reception antennas 31, the reflected wave that is the transmission wave reflected off an object, for example (step S23). The operation in step S23 may be performed in the same and/or similar manner as the operation in step S2 illustrated in FIG. 7.

After the reflected wave is received in step S23, the control unit 10 (the object detecting unit 14) detects an object that reflects the transmission wave, on the basis of the transmission signal and the reception signal (step S24). In step S24, the control unit 10 (the object detecting unit 14) detects an object that reflects the transmission wave, on the basis of the generated parameter received in step S21.

As described above, the parameter to be used by the electronic device 1 according to the first embodiment in determining whether an object is detected by the electronic device 1 is supplied from the information processing apparatus 80. The parameter to be used in determining whether an object is detected by the electronic device 1 may be a parameter generated in accordance with the statistical information obtained by performing the statistical processing on the sensing information obtained at the location of the electronic device 1 by the information processing apparatus 80. The information processing apparatus 80 may be a device other than the electronic device 1.

In general, whether another radar that uses the same frequency band is located around a radar is not taken into consideration in a detection determination process performed by the radar. Thus, for example, issues below are expected. Specifically, for example, if another radar that uses the same frequency band is located around a radar, a signal level or a noise level in that frequency band may increase. In this case, a difference between a level of a reflected signal from an object to be detected and a noise level may decrease. As a result, there is concern about a risk of overlooking the object to be detected. When a plurality of other radars are simultaneously located around the radar, the increase in the signal level or the noise level in that frequency band is marked. In this case, there is further concern about the risk of overlooking the object to be detected. On the other hand, when no radar that uses the same frequency band is located around the radar, the signal level or the noise level in that frequency band is low and stable. In such a case, the object to be detected can be expectedly detected accurately. However, since the noise level is so low, a risk of detecting, that is, too sensitively detecting, an object not to be detected, for example, a small object is also expected.

In general, a surrounding environment in which a radar is operating, for example, whether there are many reflecting objects is not taken into consideration in the detection determination process performed by the radar. Thus, for example, issues below are expected. Specifically, for example, when the surrounding environment in which the radar is operating is hard to see ahead, for example, a narrow road or a lane with many buildings therearound, the average intensity of the power of the reflected wave increases. When the surrounding environment in which the radar is operating is hard to see ahead, the number of reflected waves also expectedly increases. In this case, it may become difficult to select a reflected wave from an object to be detected. Thus, there is concern about a risk of overlooking the object to be detected. On the other hand, the environment in which the radar is operating is clear, for example, an environment in which there are a plurality of lanes and there are no other automobiles or a road in the meadow, the average intensity of the power of the reflected wave is low. When the surrounding environment in which the radar is operating is clear, the number of reflected waves also expectedly decreases. In such a case, the object to be detected can be expectedly detected accurately. However, a risk of detecting an object not to be detected, for example, a small object is still expected.

The electronic device 1 according to the first embodiment transmits, to the information processing apparatus 80, for example, a server, a computation result in radar processing as the sensing information. In the first embodiment, a noise power value can be used as the sensing information, and the parameter, for example, a power threshold, for use in detection of an object can be set variable. In the first embodiment, the number of detected objects can be used as the sensing information, and the parameter, for example, the noise power estimation ranges, for use in detection of an object can be set variable.

In the first embodiment, the information processing apparatus 80, for example, a server generates the parameter to be used in radar processing on the basis of the sensing information from the electronic device 1, and distributes the parameter to the radar again. The information processing apparatus 80 performs statistical processing on the sensing information from the electronic device 1 managed thereby and generates the parameter for each divided area.

In the first embodiment, the electronic device 1 performs detection of an object by using the generated parameter received from the information processing apparatus 80. Thus, the electronic device 1 according to the first embodiment not only can sensitively detect a detection target but also can reduce erroneous detection of an unnecessary target by using the generated parameter. Since the electronic device 1 according to the first embodiment can detect an object highly reliably and highly accurately, the electronic device 1 contributes to improvement of the object detection accuracy.

A database stored in at least one of the storage unit 40 of the sensor 5 and the storage unit 88 of the information processing apparatus 80 is described with reference to FIG. 15. FIG. 15 is a conceptual diagram of the database stored in at least one of the storage unit 40 of the sensor 5 and the storage unit 88 of the information processing apparatus 80.

As illustrated in FIG. 15, a database DB 1501 stores a location D1, a time slot D2, a time of year D3, sensing information D4, and a parameter adjustment value D5.

The location information D1 is information including a predetermined location range. The location information D1 includes location information transmitted from the sensor 5, previously set location information, or the like. The location information D1 may include latitude/longitude information, direction information, or information on a region, country, prefecture, county, and/or state. The location information D1 may be information indicating a divided area obtained by virtually dividing a map of a certain region into a mesh of several meters in all directions, for example. The virtually divided areas may have any size, for example, one meter or several kilometers in all directions. The shape of the virtually divided areas is not limited to the mesh shape and may be any shape such as a triangular shape or a honeycomb shape.

The time slot D2 includes a predetermined time range. The time range may be in units of 24 hours or may be another time range.

The time of year D3 includes a predetermined date range. The date range may be in units of years or may be another date range.

The statistical information D4 is information obtained by performing the statistical processing on the sensing information transmitted from the sensor 5.

The parameter adjustment value D5 is information generated on the basis of the statistical information D4.

The parameter D6 is a parameter obtained through adjustment using the parameter adjustment value D5.

The database DB 1501 may appropriately include information other than the information illustrated in FIG. 15. The information illustrated in FIG. 15 may be updated every time information is transmitted from the sensor 5. At least one of the storage unit 40 of the sensor 5 and the storage unit 88 of the information processing apparatus 80 may include a database that stores the sensing information transmitted from the mobility device 5. The information illustrated in FIG. 15 may be appropriately deleted from the database DB 1501.

Second Embodiment

A system according to a second embodiment is described next.

The second embodiment is equivalent to the first embodiment described above in which part of processing is changed. The system according to the second embodiment can be configured in the same and/or similar manner as the system according to the first embodiment described above. That is, the system according to the second embodiment includes at least one electronic device 1 and the information processing apparatus 80. The electronic device 1 according to the second embodiment can be configured in the same and/or similar manner as the electronic device 1 according to the first embodiment. The information processing apparatus 80 according to the second embodiment can be configured in the same and/or similar manner as the information processing apparatus 80 according to the first embodiment. Duplicate description of the description of the first embodiment above is appropriately simplified or omitted below.

In the first embodiment described above, the information processing apparatus 80 that has received the sensing information from the electronic device 1 generates the parameter in accordance with the statistical information generated from the sensing information, and transmits the generated parameter to the electronic device 1. In contrast, in the second embodiment, the information processing apparatus 80 that has received the sensing information from the electronic device 1 generates statistical information from the sensing information, and transmits the generated statistical information to the electronic device 1. In the second embodiment, the electronic device 1 generates the parameter in accordance with the statistical information, and determines, by using the generated parameter, whether an object is detected. Such an operation is described in more detail below.

An operation performed until the electronic device 1 according to the second embodiment transmits the sensing information based on the transmission signal and the reception signal at the location of the electronic device 1 to the information processing apparatus 80 can be performed in the same and/or similar manner as the operation in the first embodiment. That is, also in the second embodiment, the electronic device 1 may perform the same and/or similar operation as that illustrated in FIG. 7.

Figure 13:
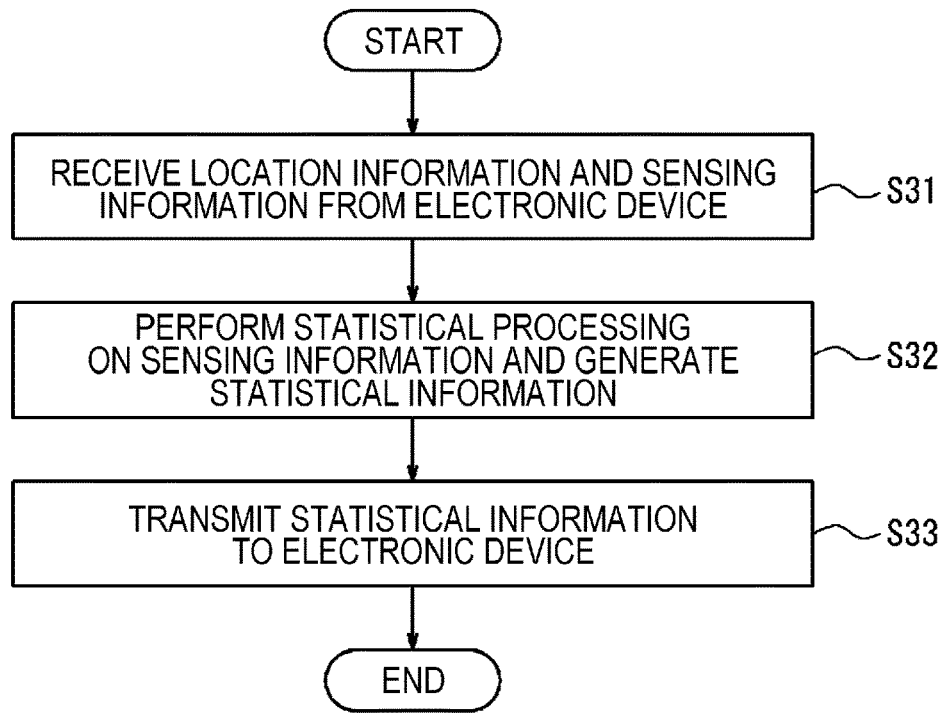
FIG. 13 is a flowchart for describing an operation of an information processing apparatus according to a second embodiment.

FIG. 13 is a flowchart for describing an operation performed until the information processing apparatus 80 according to the second embodiment transmits, to the electronic device 1, a result obtained by processing information received from the electronic device 1. After the electronic device 1 performs the operation illustrated in FIG. 7, the information processing apparatus 80 according to the second embodiment performs the operation illustrated in FIG. 13 instead of the operation illustrated in FIG. 8.

In response to the start of the operation illustrated in FIG. 13, the reception unit 84 of the information processing apparatus 80 performs an operation in step S31. The operation in step S31 can be performed in the same and/or similar manner as the operation in step S11 in FIG. 8.

After the operation in step S31 is performed, the control unit 82 of the information processing apparatus 80 performs an operation in step S32. The operation in step S32 can be performed in the same and/or similar manner as the operation in step S12 in FIG. 8.

After the operation in step S32 is performed, the transmission unit 86 of the information processing apparatus 80 transmits the statistical information generated in step S32 to the electronic device 1 (step S33).

As described above, as in the first embodiment, the reception unit 84 of the information processing apparatus 80 according to the second embodiment receives, from the electronic device 1, the sensing information based on the transmission signal and the reception signal at the location of the electronic device 1 along with the location information of the electronic device 1. As in the first embodiment, in the second embodiment, the control unit 82 generates the statistical information by performing the statistical processing on the sensing information obtained at the location of the electronic device 1. However, in the second embodiment, the transmission unit 86 transmits the statistical information generated by the control unit 82 to the electronic device 1.

Figure 14:
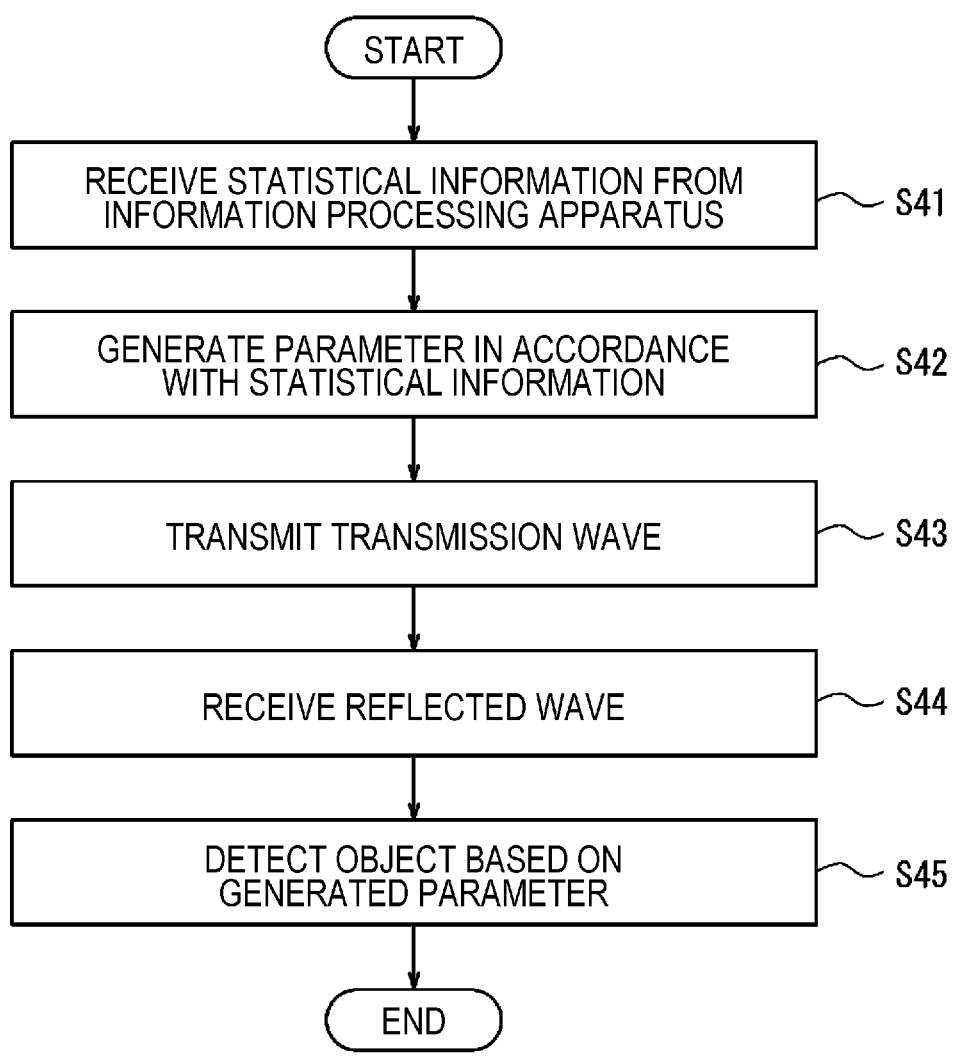
FIG. 14 is a flowchart for describing an operation of an electronic device according to the second embodiment.

FIG. 14 is a flowchart for describing an operation performed until the electronic device 1 according to the second embodiment performs detection of an object on the basis of a result obtained by processing the information received from the information processing apparatus 80. After the information processing apparatus 80 performs the operation illustrated in FIG. 13, the electronic device 1 according to the second embodiment performs the operation illustrated in FIG. 14 instead of the operation illustrated in FIG. 12.

In response to the start of the operation illustrated in FIG. 14, the communication unit 70 of the electronic device 1 receives the statistical information transmitted from the information processing apparatus 80 in step S33 in FIG. 13 (step S41).

After the statistical information is received in step S41, the control unit 10 of the electronic device 1 generates a parameter in accordance with the statistical information (step S42). That is, in the first embodiment described above, the operation for generating the parameter in accordance with the statistical information is performed by the information processing apparatus 80 as indicated by step S13 in FIG. 8. In contrast, in the second embodiment, the operation for generating the parameter in accordance with the statistical information is performed by the electronic device 1 as indicated by step S42 in FIG. 14. As described above, the operation in step S42 in FIG. 14 can be performed in the same and/or similar manner as the operation in step S13 in FIG. 8.

After the parameter is generated in step S42, the control unit 10 of the electronic device 1 transmits a transmission wave from the transmission antennas 25 (step S43). The operation in step S43 may be performed in the same and/or similar manner as the operation in step S22 in FIG. 12 or the operation in step S1 in FIG. 7.

After the transmission wave is transmitted in step S43, the control unit 10 receives, from the reception antennas 31, the reflected wave that is the transmission wave reflected off an object, for example (step S44). The operation in step S44 may be performed in the same and/or similar manner as the operation in step S23 in FIG. 12 or the operation in step S2 in FIG. 7.

After the reflected wave is received in step S44, the control unit 10 (the object detecting unit 14) detects the object that reflects the transmission wave, on the basis of the transmission signal and the reception signal (step S45). In step S44, the control unit 10 (the object detecting unit 14) detects the object that reflects the transmission wave, on the basis of the parameter generated in step S42.

As described above, in the electronic device 1 according to the second embodiment, the control unit 10 may generate a parameter to be used in determining whether an object is detected by the electronic device 1, in accordance with the statistical information obtained by performing, by the information processing apparatus 80, the statistical processing on the sensing information for the location of the electronic device 1. The information processing apparatus 80 may be a device other than the electronic device 1.

In the second embodiment, the electronic device 1 performs detection of an object by using the parameter generated in accordance with the statistical information received from the information processing apparatus 80. Thus, the electronic device 1 according to the second embodiment not only can sensitively detect a detection target but also can reduce erroneous detection of an unnecessary target by using the generated parameter. Since the electronic device 1 according to the second embodiment can also detect an object highly reliably and highly accurately, the electronic device 1 contributes to improvement of the object detection accuracy.

While the present disclosure has been described on the basis of the various drawings and the embodiments, it should be noted that a person skilled in the art can easily make various variations or corrections on the basis of the present disclosure. Therefore, it should be noted that these variations or corrections are within the scope of the present disclosure. For example, functions and the like included in each functional unit can be rearranged without any logical contradiction. A plurality of functional units or the like may be combined into one or may be divided. The embodiments according to the present disclosure described above are not limited to being implemented strictly in accordance with the respective embodiments described above, and may be implemented by appropriately combining the features or omitting part thereof. That is, a person skilled in the art can make various variations and corrections to the contents of the present disclosure on the basis of the present disclosure. Thus, these variations and corrections are within the scope of the present disclosure. For example, in each embodiment, each functional unit, each means, each step, or the like can be added to another embodiment or replaced with each functional unit, each means, each step, or the like in another embodiment without any logical contradiction. In each embodiment, a plurality of functional units, means, steps, or the like may be combined to one or may be divided. The embodiments according to the present disclosure described above are not limited to being implemented strictly in accordance with the respective embodiments described above, and may be implemented by appropriately combining the features or omitting part thereof.

For example, in the embodiments described above, the description has been given of the configuration in which the object detection ranges are dynamically switched between by using the one sensor 5. However, in one embodiment, detection of an object may be performed in the determined object detection ranges by using the plurality of sensors 5. In one embodiment, beamforming may be performed toward the determined object detection ranges by using the plurality of sensors 5.

The embodiments described above are not limited to implementation as the electronic device 1. For example, the embodiments described above may be implemented as a method for controlling a device such as the electronic device 1. For example, the embodiments described above may be implemented as a program for controlling a device such as the electronic device 1.

The electronic device 1 according to one embodiment may include, as the minimum configuration, at least part of at least one of the sensor 5 and the control unit 10, for example. On the other hand, the electronic device 1 according to one embodiment may appropriately include at least any of the signal generating unit 21, the synthesizer 22, the phase control units 23, the amplifiers 24, and the transmission antennas 25 illustrated in FIG. 2 in addition to the control unit 10. The electronic device 1 according to the one embodiment may appropriately include at least any of the reception antennas 31, the LNAs 32, the mixers 33, the IF units 34, and the AD conversion units 35 instead of or along with the functional units described above. The electronic device 1 according to the one embodiment may further include the storage unit 40. As described above, the electronic device 1 according to the one embodiment can employ various configurations. When the electronic device 1 according to the one embodiment is mounted in the mobility device 100, for example, at least any of the functional units described above may be installed at an appropriate place such as the inside of the mobility device 100. On the other hand, in one embodiment, for example, at least any of the transmission antennas 25 and the reception antennas 31 may be installed outside the mobility device 100.

REFERENCE SIGNS LIST 1 electronic device
5 sensor
10 control unit
11 distance FFT processing unit
12 velocity FFT processing unit
13 angle-of-arrival estimating unit
14 object detecting unit
15 detection range determining unit
16 parameter setting unit
20 transmission unit
21 signal generating unit
22 synthesizer
23 phase control unit
24 amplifier
25 transmission antenna
30 reception unit
31 reception antenna
32 LNA
33 mixer
34 IF unit
35 AD conversion unit
40 storage unit
50 ECU
60 location acquisition unit (GPS or the like)
70 communication unit (transmission unit/reception unit)
80 information processing apparatus
82 control unit
84 reception unit
86 transmission unit
88 storage unit
100 mobility device
200 object

The invention claimed is:

1. An electronic device comprising:
a transmission antenna that transmits a transmission wave;
a reception antenna that receives a reflected wave that is the reflected transmission wave; and
a control unit that detects an object that reflects the transmission wave, based on a transmission signal transmitted as the transmission wave and a reception signal received as the reflected wave,
wherein the electronic device transmits, to an information processing apparatus, sensing information based on at least one of the transmission signal and the reception signal at a location of the electronic device along with location information of the electronic device.

2. The electronic device according to claim 1, wherein the control unit receives, from the information processing apparatus, a parameter to be used in determining whether the object is detected.

3. The electronic device according to claim 1, wherein the control unit receives statistical information obtained through statistical processing performed by the information processing apparatus, and based on the statistical information, the control unit generates a parameter to be used in determining whether the object is detected by the electronic device.

4. The electronic device according to claim 1, wherein the sensing information includes information related to a noise level at the location of the electronic device during detection of the object.

5. The electronic device according to claim 1, wherein the sensing information includes information related to the number of objects detected from the location of the electronic device.

6. An information processing apparatus that communicates with an electronic device that detects, based on a transmission signal transmitted as a transmission wave and a reception signal received as a reflected wave that is the reflected transmission wave, an object that reflects the transmission wave, the information processing apparatus comprising:
a reception unit that receives, from the electronic device, sensing information based on at least one of the transmission signal and the reception signal at a location of the electronic device along with location information of the electronic device;
a control unit that performs statistical processing on the sensing information obtained at the location of the electronic device to generate statistical information, and generates, in accordance with the statistical information, a parameter to be used in determining whether the object is detected by the electronic device; and
a transmission unit that transmits the parameter generated by the control unit to the electronic device.

7. The information processing apparatus according to claim 6, wherein the sensing information includes information related to a noise level at the location of the electronic device during detection of the object.

8. The information processing apparatus according to claim 6, wherein the sensing information includes information related to the number of objects detected from the location of the electronic device.

9. An information processing apparatus that communicates with an electronic device that detects, based on a transmission signal transmitted as a transmission wave and a reception signal received as a reflected wave that is the reflected transmission wave, an object that reflects the transmission wave, the information processing apparatus comprising:
a reception unit that receives, from the electronic device, sensing information based on at least one of the transmission signal and the reception signal at a location of the electronic device along with location information of the electronic device;
a control unit that performs statistical processing on the sensing information obtained at the location of the electronic device to generate statistical information; and
a transmission unit that transmits the statistical information generated by the control unit to the electronic device.

10. A data structure for use in generating a parameter to be used in determining whether an object is detected by an electronic device, the electronic device including:
a transmission antenna that transmits a transmission wave;
a reception antenna that receives a reflected wave that is the reflected transmission wave; and
a control unit that detects the object that reflects the transmission wave, based on a transmission signal transmitted as the transmission wave and a reception signal received as the reflected wave, the data structure comprising:

location information of the electronic device; and statistical information based on at least one of the transmission signal and the reception signal associated with the location information of the electronic device, wherein the parameter is generated based on the statistical information.

11. The data structure according to claim 10, wherein a value for adjusting the parameter is stored in association with the location information of the electronic device.

12. A method comprising:

a step of transmitting a transmission wave from a transmission antenna;

a step of receiving, from a reception antenna, a reflected wave that is the reflected transmission wave;

a step of detecting an object that reflects the transmission wave, based on a transmission signal transmitted as the transmission wave and a reception signal received as the reflected wave; and a step of transmitting, to an information processing apparatus, sensing information based on at least one of the transmission signal and the reception signal at a location of a device along with location information of the device.

13. A non-transitory computer-readable recording medium storing computer program instructions, which when executed by a computer, cause the computer to perform:

transmit a transmission wave from a transmission antenna;

receive, from a reception antenna, a reflected wave that is the reflected transmission wave;

detect an object that reflects the transmission wave, based on a transmission signal transmitted as the transmission wave and a reception signal received as the reflected wave; and transmit, to an information processing apparatus, sensing information based on at least one of the transmission signal and the reception signal at a location of the computer along with location information of the computer.

* * * * *